US008542921B1

(12) United States Patent
Medina

(10) Patent No.: US 8,542,921 B1
(45) Date of Patent: Sep. 24, 2013

(54) SYSTEMS AND METHODS FOR REMOTE DEPOSIT OF NEGOTIABLE INSTRUMENT USING BRIGHTNESS CORRECTION

(75) Inventor: Reynaldo Medina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 724 days.

(21) Appl. No.: 12/509,613

(22) Filed: Jul. 27, 2009

(51) Int. Cl.
*G06K 9/38* (2006.01)

(52) U.S. Cl.
USPC ............................................. 382/172

(58) Field of Classification Search
USPC ............... 382/100, 137–139, 162, 167–172; 705/1.1, 16–18, 26.1, 35, 39–45; 455/406; 283/57–59, 72; 235/375, 379–381
See application file for complete search history.

(56) References Cited

U.S. PATENT DOCUMENTS

| | | | |
|---|---|---|---|
| 3,005,282 A | 10/1961 | Christiansen | |
| 3,341,820 A | 9/1967 | Grillmeier, Jr. et al. | |
| 3,576,972 A | 5/1971 | Wood | |
| 3,593,913 A | 7/1971 | Bremer | |
| 3,620,553 A | 11/1971 | Donovan | |
| 3,648,242 A | 3/1972 | Grosbard | |
| 3,800,124 A | 3/1974 | Walsh | |
| 3,816,943 A | 6/1974 | Henry | |
| 4,002,356 A | 1/1977 | Weidmann | |
| 4,060,711 A | 11/1977 | Buros | |
| 4,070,649 A | 1/1978 | Wright, Jr. et al. | |
| 4,128,202 A | 12/1978 | Buros | |
| 4,136,471 A | 1/1979 | Austin | |
| 4,205,780 A | 6/1980 | Burns | |
| 4,264,808 A | 4/1981 | Owens | |
| 4,305,216 A | 12/1981 | Skelton | |
| 4,321,672 A | 3/1982 | Braun | |
| 4,433,436 A | 2/1984 | Carnes | |
| 4,454,610 A | 6/1984 | Sziklai | |
| RE31,692 E | 10/1984 | Tyburski et al. | |
| 4,523,330 A | 6/1985 | Cain | |
| 4,636,099 A | 1/1987 | Goldston | |
| 4,640,413 A | 2/1987 | Kaplan | |
| 4,644,144 A | 2/1987 | Chandek | |
| 4,722,444 A | 2/1988 | Murphy | |

(Continued)

FOREIGN PATENT DOCUMENTS

EP        0 984 410 A1        3/2000

OTHER PUBLICATIONS

"Adjusting Brightness and Contrast", www.eaglesoftware.com, 4 pages.

(Continued)

*Primary Examiner* — Jose Couso
(74) *Attorney, Agent, or Firm* — Brinks Hofer Gilson & Lione

(57) ABSTRACT

An image of a negotiable instrument may be taken by an imaging device and provided from a user to a financial institution. The image may be processed using operations such as deskewing the image, dewarping the image, and detecting corners or edges of the check in the image. Brightness correction may then be performed on the image. The brightness correction may be performed on the image using a histogram of the image with an overlaid reference mark. The negotiable instrument may be deposited in a user's account using the brightness corrected image.

21 Claims, 11 Drawing Sheets

(56) References Cited

U.S. PATENT DOCUMENTS

| | | |
|---|---|---|
| 4,722,544 A | 2/1988 | Weber |
| 4,727,435 A | 2/1988 | Otani et al. |
| 4,774,663 A | 9/1988 | Musmanno |
| 4,790,475 A | 12/1988 | Griffin |
| 4,806,780 A | 2/1989 | Yamamoto et al. |
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell |
| 5,419,588 A | 5/1995 | Wood |
| 5,422,467 A | 6/1995 | Graef |
| 5,444,794 A | 8/1995 | Uhland, Sr. |
| 5,475,403 A | 12/1995 | Havlovick et al. |
| 5,504,538 A | 4/1996 | Tsujihara et al. |
| 5,504,677 A | 4/1996 | Pollin |
| 5,528,387 A | 6/1996 | Kelly et al. |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett |
| 5,678,046 A | 10/1997 | Cahill |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger |
| 5,878,337 A | 3/1999 | Joao |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,073,119 A | 6/2000 | Bornemisza-wahr |
| 6,085,168 A | 7/2000 | Mori |
| 6,097,834 A | 8/2000 | Krouse |
| 6,097,845 A | 8/2000 | Ng et al. |
| 6,097,885 A | 8/2000 | Rayner |
| 6,105,865 A | 8/2000 | Hardesty |
| 6,141,339 A | 10/2000 | Kaplan et al. |
| 6,145,738 A | 11/2000 | Stinson et al. |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 * | 6/2002 | Wesolkowski et al. ....... 382/237 |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens et al. |
| 6,464,134 B1 | 10/2002 | Page |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B1 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | McNeal |
| 6,738,496 B1 | 5/2004 | Van Hall |
| 6,742,128 B1 | 5/2004 | Joiner |
| 6,745,186 B1 | 6/2004 | Testa et al. |

| Patent | Kind | Date | Name |
|---|---|---|---|
| 6,754,640 | B2 | 6/2004 | Bozeman |
| 6,755,340 | B1 | 6/2004 | Voss |
| 6,763,226 | B1 | 7/2004 | McZeal |
| 6,781,962 | B1 | 8/2004 | Williams |
| 6,786,398 | B1 | 9/2004 | Stinson |
| 6,789,054 | B1 | 9/2004 | Makhlouf |
| 6,796,491 | B2 | 9/2004 | Nakajima |
| 6,806,903 | B1 | 10/2004 | Okisu et al. |
| 6,813,733 | B1 | 11/2004 | Li |
| 6,829,704 | B2 | 12/2004 | Zhang |
| 6,844,885 | B2 | 1/2005 | Anderson |
| 6,856,965 | B1 | 2/2005 | Stinson |
| 6,863,214 | B2 | 3/2005 | Garner et al. |
| 6,870,947 | B2 | 3/2005 | Kelland |
| 6,883,140 | B1 | 4/2005 | Acker |
| 6,898,314 | B2 | 5/2005 | Kung et al. |
| 6,902,105 | B2 | 6/2005 | Koakutsu |
| 6,913,188 | B2 | 7/2005 | Wong |
| 6,931,591 | B1 | 8/2005 | Brown |
| 6,934,719 | B2 | 8/2005 | Nally |
| 6,957,770 | B1 | 10/2005 | Robinson |
| 6,961,689 | B1 | 11/2005 | Greenberg |
| 6,970,843 | B1 | 11/2005 | Forte |
| 6,973,589 | B2 | 12/2005 | Wright |
| 6,983,886 | B2 | 1/2006 | Natsukari et al. |
| 6,993,507 | B2 | 1/2006 | Meyer |
| 6,996,263 | B2 | 2/2006 | Jones et al. |
| 6,999,943 | B1 | 2/2006 | Johnson |
| 7,003,040 | B2 | 2/2006 | Yi |
| 7,004,382 | B2 | 2/2006 | Sandru |
| 7,010,155 | B2 | 3/2006 | Koakutsu et al. |
| 7,010,507 | B1 | 3/2006 | Anderson |
| 7,016,704 | B2 | 3/2006 | Pallakoff |
| 7,039,048 | B1 | 5/2006 | Monta |
| 7,058,036 | B1 | 6/2006 | Yu |
| 7,062,099 | B2 | 6/2006 | Li et al. |
| 7,062,456 | B1 | 6/2006 | Riehl et al. |
| 7,062,768 | B2 | 6/2006 | Kubo |
| 7,072,862 | B1 | 7/2006 | Wilson |
| 7,076,458 | B2 | 7/2006 | Lawlor et al. |
| 7,086,003 | B2 | 8/2006 | Demsky |
| 7,092,561 | B2 | 8/2006 | Downs, Jr. |
| 7,104,443 | B1 | 9/2006 | Paul et al. |
| 7,113,925 | B2 | 9/2006 | Waserstein |
| 7,114,649 | B2 | 10/2006 | Nelson et al. |
| 7,139,594 | B2 | 11/2006 | Nagatomo |
| 7,140,539 | B1 | 11/2006 | Crews |
| 7,163,347 | B2 | 1/2007 | Lugg |
| 7,178,721 | B2 | 2/2007 | Maloney |
| 7,181,430 | B1 | 2/2007 | Buchanan et al. |
| 7,184,980 | B2 | 2/2007 | Allen-Rouman et al. |
| 7,197,173 | B2 | 3/2007 | Jones et al. |
| 7,200,255 | B2 | 4/2007 | Jones |
| 7,204,412 | B2 | 4/2007 | Foss, Jr. |
| 7,216,106 | B1 | 5/2007 | Buchanan |
| 7,219,082 | B2 | 5/2007 | Forte |
| 7,219,831 | B2 | 5/2007 | Murata |
| 7,249,076 | B1 | 7/2007 | Pendleton |
| 7,252,224 | B2 | 8/2007 | Verma |
| 7,257,246 | B1 | 8/2007 | Brodie et al. |
| 7,266,230 | B2 | 9/2007 | Doran |
| 7,290,034 | B2 | 10/2007 | Budd |
| 7,299,970 | B1 | 11/2007 | Ching |
| 7,299,979 | B2 | 11/2007 | Phillips |
| 7,313,543 | B1 | 12/2007 | Crane |
| 7,314,163 | B1 | 1/2008 | Crews et al. |
| 7,321,874 | B2 | 1/2008 | Dilip |
| 7,321,875 | B2 | 1/2008 | Dilip |
| 7,325,725 | B2 | 2/2008 | Foss, Jr. |
| 7,328,190 | B2 | 2/2008 | Smith et al. |
| 7,330,604 | B2 | 2/2008 | Wu et al. |
| 7,336,813 | B2 | 2/2008 | Prakash et al. |
| 7,343,320 | B1 | 3/2008 | Treyz |
| 7,349,566 | B2 | 3/2008 | Jones et al. |
| 7,356,505 | B2 | 4/2008 | March |
| 7,377,425 | B1 | 5/2008 | Ma |
| 7,379,978 | B2 | 5/2008 | Anderson |
| 7,385,631 | B2 | 6/2008 | Maeno |
| 7,386,511 | B2 | 6/2008 | Buchanan |
| 7,391,897 | B2 | 6/2008 | Jones |
| 7,391,934 | B2 | 6/2008 | Goodall et al. |
| 7,392,935 | B2 | 7/2008 | Byrne |
| 7,401,048 | B2 | 7/2008 | Rosedale |
| 7,403,917 | B1 | 7/2008 | Larsen |
| 7,406,198 | B2 * | 7/2008 | Aoki et al. .................... 382/218 |
| 7,421,107 | B2 | 9/2008 | Lugg |
| 7,421,410 | B1 | 9/2008 | Schechtman et al. |
| 7,433,098 | B2 | 10/2008 | Klein et al. |
| 7,437,327 | B2 | 10/2008 | Lam |
| 7,440,924 | B2 | 10/2008 | Buchanan |
| 7,447,347 | B2 | 11/2008 | Weber |
| 7,455,220 | B2 | 11/2008 | Phillips |
| 7,455,221 | B2 | 11/2008 | Sheaffer |
| 7,460,108 | B2 | 12/2008 | Tamura |
| 7,461,779 | B2 | 12/2008 | Ramachandran |
| 7,461,780 | B2 | 12/2008 | Potts |
| 7,471,818 | B1 | 12/2008 | Price |
| 7,475,040 | B2 | 1/2009 | Buchanan |
| 7,477,923 | B2 | 1/2009 | Wallmark |
| 7,480,382 | B2 | 1/2009 | Dunbar |
| 7,480,422 | B2 | 1/2009 | Ackley et al. |
| 7,489,953 | B2 | 2/2009 | Griffin |
| 7,490,242 | B2 | 2/2009 | Torres |
| 7,497,429 | B2 | 3/2009 | Reynders |
| 7,503,486 | B2 | 3/2009 | Ahles |
| 7,505,759 | B1 | 3/2009 | Rahman |
| 7,506,261 | B2 | 3/2009 | Satou |
| 7,509,287 | B2 | 3/2009 | Nutahara |
| 7,512,564 | B1 | 3/2009 | Geer |
| 7,519,560 | B2 | 4/2009 | Lam |
| 7,520,420 | B2 | 4/2009 | Phillips |
| 7,520,422 | B1 | 4/2009 | Robinson et al. |
| 7,536,354 | B1 | 5/2009 | deGroeve |
| 7,536,440 | B2 | 5/2009 | Budd |
| 7,539,646 | B2 | 5/2009 | Gilder |
| 7,540,408 | B2 | 6/2009 | Levine |
| 7,542,598 | B2 | 6/2009 | Jones |
| 7,545,529 | B2 | 6/2009 | Borrey et al. |
| 7,548,641 | B2 | 6/2009 | Gilson et al. |
| 7,566,002 | B2 | 7/2009 | Love et al. |
| 7,571,848 | B2 | 8/2009 | Cohen |
| 7,587,066 | B2 | 9/2009 | Cordery et al. |
| 7,587,363 | B2 | 9/2009 | Cataline |
| 7,590,275 | B2 | 9/2009 | Clarke et al. |
| 7,599,543 | B2 | 10/2009 | Jones |
| 7,599,888 | B2 | 10/2009 | Manfre |
| 7,602,956 | B2 | 10/2009 | Jones |
| 7,606,762 | B1 | 10/2009 | Heit |
| 7,609,873 | B2 | 10/2009 | Foth et al. |
| 7,619,721 | B2 | 11/2009 | Jones |
| 7,620,231 | B2 | 11/2009 | Jones |
| 7,620,604 | B1 | 11/2009 | Bueche, Jr. |
| 7,630,518 | B2 | 12/2009 | Frew et al. |
| 7,644,037 | B1 | 1/2010 | Ostrovsky |
| 7,644,043 | B2 | 1/2010 | Minowa |
| 7,647,275 | B2 | 1/2010 | Jones |
| 7,668,363 | B2 | 2/2010 | Price |
| 7,672,940 | B2 | 3/2010 | Viola |
| 7,676,409 | B1 | 3/2010 | Ahmad |
| 7,680,735 | B1 | 3/2010 | Loy |
| 7,689,482 | B2 | 3/2010 | Lam |
| 7,697,776 | B2 | 4/2010 | Wu et al. |
| 7,698,222 | B1 | 4/2010 | Bueche, Jr. |
| 7,702,588 | B2 | 4/2010 | Gilder et al. |
| 7,734,545 | B1 | 6/2010 | Fogliano |
| 7,743,979 | B2 | 6/2010 | Fredman |
| 7,753,268 | B1 | 7/2010 | Robinson et al. |
| 7,761,358 | B2 | 7/2010 | Craig et al. |
| 7,766,244 | B1 | 8/2010 | Field |
| 7,769,650 | B2 | 8/2010 | Bleunven |
| 7,792,752 | B1 | 9/2010 | Kay |
| 7,792,753 | B1 | 9/2010 | Slater et al. |
| 7,810,714 | B2 | 10/2010 | Murata |
| 7,818,245 | B2 | 10/2010 | Prakash et al. |
| 7,856,402 | B1 | 12/2010 | Kay |
| 7,873,200 | B1 | 1/2011 | Oakes, III et al. |
| 7,876,949 | B1 | 1/2011 | Oakes, III et al. |
| 7,885,451 | B1 | 2/2011 | Walls et al. |

| | | |
|---|---|---|
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,949,587 B1 | 5/2011 | Morris et al. |
| 7,950,698 B2 | 5/2011 | Popadic et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,204,293 B2 | 6/2012 | Csulits et al. |
| 8,235,284 B1 | 8/2012 | Prasad et al. |
| 8,320,657 B1 | 11/2012 | Burks et al. |
| 2001/0004235 A1 | 6/2001 | Maloney |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0159648 A1 | 10/2002 | Alderson et al. |
| 2002/0171820 A1 | 11/2002 | Okamura |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0108164 A1 | 5/2005 | Salafia |
| 2005/0108168 A1 | 5/2005 | Halpin |

| | | |
|---|---|---|
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Andersson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li et al. |
| 2006/0039629 A1 | 2/2006 | Li |
| 2006/0041506 A1 | 2/2006 | Mason et al. |
| 2006/0045321 A1 | 3/2006 | Yu |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0106691 A1 | 5/2006 | Sheaffer |
| 2006/0106717 A1 | 5/2006 | Randle |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124730 A1 | 6/2006 | Maloney |
| 2006/0144924 A1 | 7/2006 | Stover |
| 2006/0144950 A1 | 7/2006 | Johnson |
| 2006/0161501 A1 | 7/2006 | Waserstein |
| 2006/0164682 A1 | 7/2006 | Lev |
| 2006/0167818 A1 | 7/2006 | Wentker et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0214940 A1 | 9/2006 | Kinoshita et al. |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1 | 10/2006 | Peterson |
| 2006/0249567 A1 | 11/2006 | Byrne |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1 | 12/2006 | Ikeda et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo et al. |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0156438 A1 | 7/2007 | Popadic |
| 2007/0168265 A1 | 7/2007 | Rosenberger |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0183741 A1 | 8/2007 | Lerman et al. |
| 2007/0194102 A1 | 8/2007 | Cohen et al. |
| 2007/0198432 A1 | 8/2007 | Pitroda et al. |
| 2007/0203708 A1 | 8/2007 | Polcyn et al. |
| 2007/0208816 A1 | 9/2007 | Baldwin et al. |
| 2007/0217669 A1 | 9/2007 | Swift et al. |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0021802 A1 | 1/2008 | Pendleton |
| 2008/0040280 A1 | 2/2008 | Davis et al. |
| 2008/0052182 A1 | 2/2008 | Marshall |
| 2008/0059376 A1 | 3/2008 | Davis |
| 2008/0063253 A1 | 3/2008 | Wood |
| 2008/0068674 A1 | 3/2008 | McIntyre |
| 2008/0071721 A1 | 3/2008 | Wang |
| 2008/0080760 A1 | 4/2008 | Ronca |
| 2008/0086420 A1 | 4/2008 | Gilder et al. |
| 2008/0086421 A1 | 4/2008 | Gilder |
| 2008/0091599 A1 | 4/2008 | Foss, Jr. |
| 2008/0097899 A1 | 4/2008 | Jackson et al. |
| 2008/0103790 A1 | 5/2008 | Abernethy |
| 2008/0103967 A1 | 5/2008 | Ackert et al. |
| 2008/0113674 A1 | 5/2008 | Baig |

| | | |
|---|---|---|
| 2008/0114739 A1 | 5/2008 | Hayes |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Rathbun |
| 2008/0156438 A1 | 7/2008 | Stumphauzer et al. |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder |
| 2008/0249951 A1 | 10/2008 | Gilder et al. |
| 2008/0262953 A1 | 10/2008 | Anderson |
| 2008/0275821 A1 | 11/2008 | Bishop et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0108080 A1 | 4/2009 | Meyer |
| 2009/0110281 A1 | 4/2009 | Hirabayashi |
| 2009/0141962 A1 | 6/2009 | Borgia et al. |
| 2009/0166406 A1 | 7/2009 | Pigg et al. |
| 2009/0167870 A1 | 7/2009 | Caleca et al. |
| 2009/0171819 A1 | 7/2009 | Von der Emde et al. |
| 2009/0171825 A1 | 7/2009 | Roman |
| 2009/0173781 A1 | 7/2009 | Ramachandran |
| 2009/0185738 A1 | 7/2009 | Nepomniachtchi |
| 2009/0190823 A1 | 7/2009 | Walters |
| 2009/0192938 A1 | 7/2009 | Amos |
| 2009/0236413 A1 | 9/2009 | Mueller et al. |
| 2009/0252437 A1 | 10/2009 | Li |
| 2009/0254447 A1 | 10/2009 | Blades |
| 2009/0281904 A1 | 11/2009 | Pharris |
| 2009/0313167 A1 | 12/2009 | Dujari et al. |
| 2010/0007899 A1 | 1/2010 | Lay |
| 2010/0027679 A1 | 2/2010 | Sunahara et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0082470 A1 | 4/2010 | Walach |
| 2010/0165015 A1 | 7/2010 | Barkley et al. |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0312705 A1 | 12/2010 | Caruso et al. |
| 2011/0112967 A1 | 5/2011 | Anderson et al. |
| 2011/0310442 A1 | 12/2011 | Popadic et al. |
| 2013/0021651 A9 | 1/2013 | Popadic et al. |

OTHER PUBLICATIONS

"Accept "Customer Not Present" Checks," Accept Check Online, http://checksoftware.com, Cited in patent No. 7,900,822, as dated 2007 (1 pg).
"Best practices for producing quality digital image files," Digital Images Guidelines, http://deepblue.lib.umich.edu/bitstream/2027.42/40247/1/Images-Best_Practice.pdf, downloaded 2007 (2 pgs).
"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).
"Check 21—the check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, Cited in patent No. 7,900,822, as dated 2007 (8 pgs).
"Check Fraud: A Guide to Avoiding Losses", All Net, http://all.net/books/audit/checkfraud/security.htm, Cited in patent No. 7,900,822, as dated 2007 (1 pg).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, Cited in patent No. 7,900,822, as dated 2007 (6 pgs).
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in patent No. 7,900,822, as dated 2007 (3 pgs).
"Electronic Billing Problem: The E-check is in the mail" American Banker-vol. 168, No. 95, May 19, 2003 (4 pgs).
"Frequently Asked Questions" Bank of America, http://www/bankofamerica.com/deposits/checksave/index.cfm?template-lc_faq_bymail, Cited in patent No. 7,900,822, as dated 2007 (2 pgs).
"Full Service Direct Deposit", www.nonprofitstaffing.com/images/upload/dirdepform.pdf. Cited in patent No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Cited in patent No. 7,996,316, as dated 2007 (7 pgs).
"Lesson 38—More Bank Transactions", Turtle Soft, http://www.turtlesoft.com/goldensealsoftware-manual.lesson38.htm, Cited in patent No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01-..., Nov. 25, 2008 (2 pgs).
"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).
"Refractive index" Wikipedia, the free encyclopedia; http://en.wikipedia.org./wiki/refractiveindex.com Oct. 16, 2007 (4 pgs).
"Remote Deposit Capture", Plante & Moran, http://plantemoran.com/industries/fincial/institutions/bank/resources/community+bank+advisor/2007+summer+issue/remote+deposit+capture.htm, Cited in patent No. 7,900,822, as dated 2007 (3 pgs).
"Remote Deposit" National City, http://www.nationalcity.com/smallbusiness/cashmanagement/remotedeposit/default.asp; Cited in patent No. 7,900,822, as dated 2007 (1 pg).
"Save on ATM Fees", RedEye Edition, Chicago Tribune, Chicago, IL Jun. 30, 2007 (2 pgs).
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_your business/businessbits/d908484987.brc, Cited in patent No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html , Cited in patent No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).

Amber Avalona-Butler/Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in patent No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" Cited in patent No. 7,970,677, as dated 2006, (4 pgs).
BankServ, Product Overview, http://www.bankserv.com/products/remotedeposit.htm, Cited in patent No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, Cited in patent No. 7,900,822, as dated Apr. 26, 2006 (3 pgs).
Board of Governors of the federal rserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).
Bruene, Jim; "Check Free to Enable In-Home Remote Check Deposit for Consumers and Small Business", NetBanker. Com, Financial Insite, Inc., http://www. netbanker.com/2008/02/checkfreeto_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbankercom/2008/04/digitalfederal_credit_union_a.html, Apr. 13, 2008 (3 pgs).
Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
Carrubba, P. et al., "Remote Deposit Capture: a White Paper Addressing Regulatory, Operational and Risk Issues," NetDeposit Inc., 2006 (11 pgs).
Century Remote Deposit High-Speed Scanner Users Manual Release 2006, (Century Manual), Century Bank, 2006, (32 pgs).
Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).
CNN.com/technology, "Scan, deposit checks from home", www.cnn.com/2008ITECH/biztech/02/07/check.scanning.ap/index.html, Feb. 7,2008 (3 pgs).
Constanzo, Chris, "Remote Check Deposit: Wells Captures A New Checking Twist", Bank Technology News Article—May 2005, www.americanbanker.com/btn_article.html?id=20050502YQ50FSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).

Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
DCU Members Monthly—Jan. 2008, "PC Deposit—Deposit Checks from Home!", http://www.mycreditunionnewsletter.com/dcu/0108/page1.html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
eCU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's Faq's and Congressional Testimony on Check 21, www.consumerlaw.orginitiatives/content/check21_content.html, Cited in patent No. 7,873,200, as dated Dec. 2005 (20 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC;]: Availability of Funds and Collection of Checks," Federal Registrar, Apr. 28, 1997, pp. 1-50.
Federal Reserve System, "Part IV, 12 CFR Part 229 [Regulation CC;]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (5 pgs).
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper 2000-9, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).

Gupta, Maya R. et al., "OCR binarization and image pre-processing for searching historical documents," Pattern Recognition, vol. 40, No. 2, Feb. 2007, pp. 389-397.

Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hartly, Thomas, "Banks Check Out New Image", Business First, Buffalo: Jul. 19, 2004, vol. 20, Issue 43, (3 pgs).

Heckenberg, D. "Using Mac OS X for Real-Time Image Processing" Oct. 8, 2003 (15 pgs).

Hildebrand, C. et al., "Electronic Money," Oracle, http://www.oracle.com/oramag/profit/05-feb/p15financial.html, 2005, downloaded Oct. 18, 2006 (5 pgs).

Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).

Image Master, "Photo Restoration: We specialize in digital photo restoration and photograph repair of family pictures", http://www.imphotorepair.com, Cited in patent No. 7,900,822, as downloaded Apr. 2007 (1 pg).

Investment Systems Company, "Portfolio Accounting System," 2000, pp. 1-32.

JBC, "What is a MICR Line?," eHow.com, retrieved from http://www.ehow.com/about_4684793_what-micr-line.html on May 4, 2009 (2 pgs).

Johnson, Jennifer J., Secretary of the Board; Federal Reserve System, 12 CFR Part 229, Regulation CC;, "Availability of Funds and Collection of Checks". Cited in patent No. 7,900,822, as dated 2009, (89 pgs).

Kendrick, Kevin B., "Check Kiting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).

Knestout, Brian P. et al., "Banking Made Easy" Kiplinger's Personal Finance Washington, Jul. 2003, vol. 57, Iss 7 (5 pgs).

Kornai Andras et al., "Recognition of Cursive Writing on Personal Checks", Proceedings of International Workshop on the Frontiers in Handwritting Recognition, Cited in patent No. 7,900,822, as dated Sep. 1996, (6 pgs).

Levitin, Adam J., Remote Deposit Capture: A Legal and Transactional Overview, Banking Law Journal, p. 115, 2009 (RDC).

Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).

Matthews, Deborah, "Advanced Technology Makes Remote Deposit Capture Less Risky," Indiana Bankers Association, Apr. 2008 (2 pgs).

Metro 1 Credit Union, "Remote Banking Services," hltp://ww\\i.metro1cu.org/metro1cu/remote.html, downloaded Apr. 17, 2007 (4 pgs).

Mitek systems, "Imagenet Mobile Deposit", San Diego, CA, downloaded 2009 (2 pgs).

Mitek Systems: Mitek Systems Launches First Mobile Check Deposit and Bill Pay Application, San Diego, CA, Jan. 22, 2008 (3 pgs).

Mohl, Bruce, "Banks Reimbursing ATM Fee to Compete With Larger Rivals", Boston Globe, Boston, MA, Sep. 19, 2004 (3 pgs).

Moreau, T., "Payment by Authenticated Facsimile Transmission: a Check Replacement Technology for Small and Medium Enterprises," Connotech Experts-conseils, Inc., Apr. 1995 (31 pgs).

Nelson, B. et al., "Remote deposit capture changes the retail landscape," Northwestern Financial Review, http://findarticles.com/p/articles/mi qa3799/is200607/ai_n16537250, 2006 (3 pgs).

NetBank, Inc., "Branch Out: Annual Report 2004," 2004 (150 pgs).

NetBank, Inc., "Quick Post: Deposit and Payment Forwarding Service," 2005 (1 pg).

NetDeposit Awarded Two Patents for Electronic Check Process, NetDeposit, Jun. 18, 2007, (1 pg).

Nixon, Julie et al., "Fisery Research Finds Banks are Interested in Offering Mobile Deposit Capture as an," Fiserv, Inc. Brookfield, Wis., (Business Wire), (Feb. 20, 2009), 2 pgs.

Online Deposit: Frequently Asked Questions, http://www.depositnow.com/faq.html, Copyright 2008 (1 pg).

Onlinecheck.com/Merchant Advisors, "Real-Time Check Debit", Merchant Advisors: Retail Check Processing Check Conversion, http://www.onlinecheck/wach/rcareal.htm, Cited in patent No. 7,900,822, as dated 2006 (3 pgs).

Oxley, Michael G., from committee on Financial Services; "Check Clearing for the $21^{st}$ Century Act", $108^{th}$ Congress, $1^{st}$ Session House of Representatives report 108-132, Jun. 2003 (20 pgs).

Oxley, Michael G., from the committee of conference; "Check Clearing for the $21^{st}$ Century Act" $108^{th}$ Congress, $1^{st}$ Session Senate report 108-291, Oct. 1, 2003 (27 pgs).

Palacios, Rafael et al., "Automatic Processing of Brazilian Bank Checks". Cited in patent No. 7,900,822, as dated 2002 (28 pgs).

Patterson, Scott "USAA Deposit@Home—Another Wow moment for Net Banking", NextCU.com, Jan. 26, 2007 (5 pgs).

Public Law 108-100, 108 Congress; "An Act Check Clearing for the $21^{st}$ Century Act", Oct. 28, 2003, 117 STAT. 1177 (18 pgs).

Rao, Bharat; "The Internet And The Revolution in Distribution: A Cross-Industry Examination"; Technology in Society; 1999; pp. 287-306; vol. 21, No. 3 (20 pgs).

Remotedepositcapture, URL:www.remotedepositcapture.com, Cited in patent No. 7,900,822, as dated 2006 (5 pgs).

RemoteDepositCapture.com, "PNC Bank to Offer Ease of Online Deposit Service Integrated with QuickBooks to Small Businesses", Remote Deposit Capture News Articles from Jul. 24, 2006, (2 pgs).

RemoteDepositCapture.com, Remote Deposit Capture News Articles from Jul. 6, 2006, "BankServ Announces New Remote Deposit Product Integrated with QuickBooks" (3 pgs).

Remotedepsitcapture.com, LLC, "Remote Deposit Capture Overview," ROC Overview, http://remotedepositcapture.com/overview/RDC_overview.htm, Cited in patent No. 7,900,822, as dated Mar. 12, 2007 (4 pgs).

Richey, J. C. et al., "EE 4530 Check Imaging," Nov. 18, 2008 (10 pgs).

Ritzer, J.R. "Hinky Dinky helped spearhead POS, remote banking movement", Bank Systems and Equipment, vol. 21, No. 12, Dec. 1984 (1 pg).

Rivlin, Alice M. et al., Chair, Vice Chai —Board of Governors, Committee on the Federal Reserve in the Payments Mechanism—Federal Reserve System, "The Federal Reserve in the Payments Mechanism", Jan. 1998 (41 pgs).

Rose, Sarah et al., "Best of the We: The Top 50 Financial Websites", Money, New York, Dec. 1999, vol. 28, Iss. 12 (8 pgs).

Shelby, Hon. Richard C. (Committee on Banking, Housing and Urban Affairs); "Check Truncation Act of 2003", calendar No. 168, $108^{th}$ Congress, $1^{st}$ Session Senate report 108-79, Jun. 2003 (27 pgs).

SoyBank Anywhere, "Consumer Internet Banking Service Agreement," Dec. 6, 2004 (6 pgs).

Teixeira, D., "Comment: Time to Overhaul Deposit Processing Systems," American Banker, Dec. 10, 1998, vol. 163, No. 235, p. 15 (3 pgs).

Thailandguru.com: How and where to Pay Bills @ www.thailandguru.com/paying-bills.html (2 pgs).

The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in patent No. 7,900,822, as dated Dec. 2005 (3 pgs).

The Green Sheet 2.0: Newswire, "CO-OP adds home deposit capabilities to suite of check imaging products", www.greensheet.com/newswire.php?newswire_id=8799, Mar. 5, 2008 (2 pgs).

Tygar, J.D., Atomicity in Electronic Commerce, In ACM Networker, 2:2, Apr./May 1998 (12 pgs).

Valentine, Lisa, "Remote Deposit Capture Hot Just Got Hotter," ABA Banking Journal, Mar. 2006, p. 1-9.

Wade, Will, "Early Notes: Updating Consumers on Check 21" American Banker Aug. 10, 2004 (3 pgs).

Wallison, Peter J., "Wal-Mart Case Exposes Flaws in Banking-Commerce Split", American Banker, vol. 167. No. 8, Jan. 11, 2002 (3 pgs).

Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).

Wells Fargo Commercial, "Remote Deposit", www.wellsfargo.com/com/treasury mgmtlreceivables/electronic/remote deposit, Copyright 2008 (1 pg).

White, J.M. et al., "Image Thresholding for Optical Character Recognition and Other Applications Requiring Character Image Extraction", IBM J. Res. Development, Jul. 1983, vol. 27, No. 4 (12 pgs).

Whitney et al., "Reserve Banks to Adopt DSTU X9.37/2003 Format for Check 21 Image Services", American Bankers Association, May 18, 2004, http://www.aba.com/NR/rdonlyres/CBDC1 A5C-43E3-43CC-B733-BE417C638618/35930/DSTUFormat.pdf (2 pages).

Wikipedia ®, "Remote Deposit," http://en.wikipedia.org/wiki/Remote deposit, 2007 (3 pgs).

Windowsfordevices.com, "Software lets camera phone users deposit checks, pay bills", www.windowsfordevices.com/news/NS3934956670.html, Jan. 29, 2008 (3 pgs).

Wolfe, Daniel, "Check Image Group Outlines Agenda," American Banker, New York, N.Y.: Feb 13, 2009, vol. 174, Iss. 30, p. 12. (2 pgs).

Woody Baird Associated Press, "Pastors Wife got Scammed—She Apparently Fell for Overseas Money Scheme," The Commercial Appeal, Jul. 1, 2006, p. A. 1.

Zhang, C.Y., "Robust Estimation and Image Combining" Astronomical Data Analysis Software and Systems IV, ASP Conference Series, 1995 (5 pgs).

Zions Bancorporation, "Moneytech, the technology of money in our world: Remote Deposit," http://www.bankjunior.com/pground/moneytech/remote_deposit.jsp, 2007 (2 pgs).

Application as filed on Apr. 3, 2008 for U.S. Appl. No. 12/062,143 (27 pgs).

Application as filed on Aug. 19, 2010 for U.S. Appl. No. 12/859,741 (235 pgs).

Application as filed on Aug. 21, 2008 for U.S. Appl. No. 12/195,723 (38 pgs).

Application as filed on Aug. 21, 2009 for U.S. Appl. No. 12/545,127 (45 pgs).

Application as filed on Aug. 28, 2009 for U.S. Appl. No. 12/549,443 (41 pgs).

Application as filed on Dec. 20, 2006 for U.S. Appl. No. 11/613,656 (21 pgs).

Application as filed on Dec. 20, 2012 for U.S. Appl. No. 13/721,945 (55 pgs).

Application as filed on Dec. 20, 2012 for U.S. Appl. No. 13/722,303 (32 pgs).

Application as filed on Dec. 30, 2010 for U.S. Appl. No. 12/982,494 (280 pgs).

Application as filed on Dec. 30, 2010 for U.S. Appl. No. 12/982,561 (275 pgs).

Application as filed on Dec. 30, 2010 for U.S. Appl. No. 12/982,578 (274 pgs).

Application as filed on Dec. 30, 2010 for U.S. Appl. No. 12/982,594 (275 pgs).

Application as filed on Feb. 15, 2012 for U.S. Appl. No. 13/397,405 (19 pgs).

Application as filed on Feb. 18, 2009 for U.S. Appl. No. 12/388,005 (37 pgs).

Application as filed on Jul. 13, 2006 for U.S. Appl. No. 11/487,537 (23 pgs).

Application as filed on Jul. 27, 2009 for U.S. Appl. No. 12/509,613 (48 pgs).

Application as filed on Jul. 27, 2009 for U.S. Appl. No. 12/509,680 (41 pgs).

Application as filed on Jun. 11, 2008 for U.S. Appl. No. 12/137,051 (29 pgs).

Application as filed on Jun. 8, 2011 for U.S. Appl. No. 13/155,976 (352 pgs).

Application as filed on Jun. 8, 2011 for U.S. Appl. No. 13/156,007 (356 pgs).

Application as filed on Jun. 8, 2011 for U.S. Appl. No. 13/156,018 (353 pgs).

Application as filed on Mar. 15, 2007 for U.S. Appl. No. 11/686,924 (34 pgs).

Application as filed on Mar. 15, 2007 for U.S. Appl. No. 11/686,928 (36 pgs).

Application as filed on Mar. 4, 2009 for U.S. Appl. No. 12/397,671 (40 pgs).

Application as filed on Mar. 4, 2009 for U.S. Appl. No. 12/397,930 (37 pgs).

Application as filed on May 10, 2007 for U.S. Appl. No. 11/747,222 (35 pgs).

Application as filed on Oct. 17, 2008 for U.S. Appl. No. 12/253,278 (42 pgs).

Application as filed on Oct. 19, 2012 for U.S. Appl. No. 13/656,164 (32 pgs).

Application as filed on Oct. 23, 2007 for U.S. Appl. No. 11/876,925 (36 pgs).

Application as filed on Oct. 23, 2007 for U.S. Appl. No. 11/877,335 (29 pgs).

Application as filed on Oct. 25, 2007 for U.S. Appl. No. 11/923,839 (22 pgs).

Application as filed on Oct. 29, 2007 for U.S. Appl. No. 11/926,388 (23 pgs).

Application as filed on Oct. 30, 2007 for U.S. Appl. No. 11/928,297 (26 pgs).

Application as filed on Oct. 31, 2006 for U.S. Appl. No. 11/590,974 (31 pgs).

Application as filed on Oct. 31, 2006 for U.S. Appl. No. 11/591,008 (27 pgs).

Application as filed on Oct. 31, 2006 for U.S. Appl. No. 11/591,227 (58 pgs).

Application as filed on Oct. 31, 2006 for U.S. Appl. No. 11/591,273 (56 pgs).

Application as filed on Oct. 31, 2007 for U.S. Appl. No. 11/930,537 (27 pgs).

Application as filed on Oct. 31, 2007 for U.S. Appl. No. 11/931,670 (47 pgs).

Application as filed on Oct. 8, 2007 for U.S. Appl. No. 11/868,884 (30 pgs).

Application as filed on Sep. 28, 2007 for U.S. Appl. No. 11/864,569 (35 pgs).

Application as filed on Sep. 8, 2008 for U.S. Appl. No. 12/205,996 (30 pgs).

Application as filed Sep. 14, 2012 for U.S. Appl. No. 13/619,405 (30 pgs).

Claims as filed on Apr. 3, 2008 for U.S. Appl. No. 12/062,163 (3 pgs).

Claims as filed on Apr. 3, 2008 for U.S. Appl. No. 12/062,175 (3 pgs).

Claims as filed on Aug. 19, 2010 for U.S. Appl. No. 12/859,752 (5 pgs).

Claims as filed on Dec. 15, 2011 for U.S. Appl. No. 13/327,478 (4 pgs).

Claims as filed on Dec. 20, 2006 for U.S. Appl. No. 11/613,671 (3 pgs).

Claims as filed on Dec. 20, 2012 for U.S. Appl. No. 13/722,576 (4 pgs).

Claims as filed on Dec. 20, 2012 for U.S. Appl. No. 13/722,602 (4 pgs).

Claims as filed on Dec. 29, 2005 for U.S. Appl. No. 11/320,998 (3 pgs).

Claims as filed on Dec. 29, 2005 for U.S. Appl. No. 11/321,027 (3 pgs).

Claims as filed on Dec. 8, 2010 for U.S. Appl. No. 12/963,513 (7 pgs).

Claims as filed on Feb. 15, 2012 for U.S. Appl. No. 13/397,437 (6 pgs).

Claims as filed on Feb. 16, 2011 for U.S. Appl. No. 13/028,477 (3 pgs).

Claims as filed on Jan. 20, 2011 for U.S. Appl. No. 13/010,644 (9 pgs).

Claims as filed on Jan. 31, 2011 for U.S. Appl. No. 13/017,865 (11 pgs).

Claims as filed on Mar. 15, 2007 for U.S. Appl. No. 11/686,925 (5 pgs).

Claims as filed on May 10, 2007 for U.S. Appl. No. 11/747,223 (4 pgs).

Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Nov. 20, 2012 for U.S. Appl. No. 13/682,268 (4 pgs).
Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 14, 2012 for U.S. Appl. No. 13/619,026 (3 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
Application as filed on Jan. 7, 2013 for U.S. Appl. No. 13/735,678 (30 pgs).
Application as filed on Mar. 15, 2013 for U.S. Appl. No. 13/842,112 (62 pgs).
Claims as filed on Feb. 12, 2013 for U.S. Appl. No. 13/765,412 (1 pg).
Claims as filed on Feb. 19, 2013 for U.S. Appl. No. 13/770,048 (4 pgs).

* cited by examiner

400

SYSTEMS AND METHODS FOR REMOTE DEPOSIT OF NEGOTIABLE INSTRUMENT USING BRIGHTNESS CORRECTION

BACKGROUND

Checks typically provide a safe and convenient method for an individual such as a payor to transfer funds to a payee. To use a check, the individual usually opens a checking account, or other similar account, at a financial institution and deposits funds, which are then available for later withdrawal. To transfer funds with a check, the payor usually designates a payee and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. To reduce such burdens for the payee, systems and methods have been developed to enable the remote deposit of checks. For example, the payee may scan a check in a digital image using a scanner or other imaging device and a computing device. The financial institution may then receive from the payee the digital image of the check. The financial institution may then use the digital image to credit funds to the payee. However, such a technique requires the efficient and accurate detection of the information pertaining to a check in the digital image. Detecting and extracting the information from the digital image is difficult.

SUMMARY

An image of a negotiable instrument may be taken by an imaging device and provided from a user to a financial institution via a computing device. Any technique for sending the image to the financial institution may be used. The financial institution may process the image using operations such as deskewing the image, dewarping the image, and detecting corners or edges of the check in the image. Brightness correction may then be performed on the image. The negotiable instrument may be deposited in a user's account using the brightness corrected image.

In an implementation, brightness correction may be performed on the image using a histogram of the image with an overlaid reference mark. In an implementation, a computing device of the user may determine brightness correction information of the image and provide the brightness correction information to the financial institution. The financial institution may perform brightness correction on the image using the brightness correction information received from the computing device of the user.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

In the following detailed description of example embodiments, reference is made to the accompanying drawings, which form a part hereof and in which is shown, by way of illustration, specific embodiments in which the example methods, apparatuses, and systems may be practiced. It is to be understood that other embodiments may be used and structural changes may be made without departing from the scope of this description.

Figure 1:
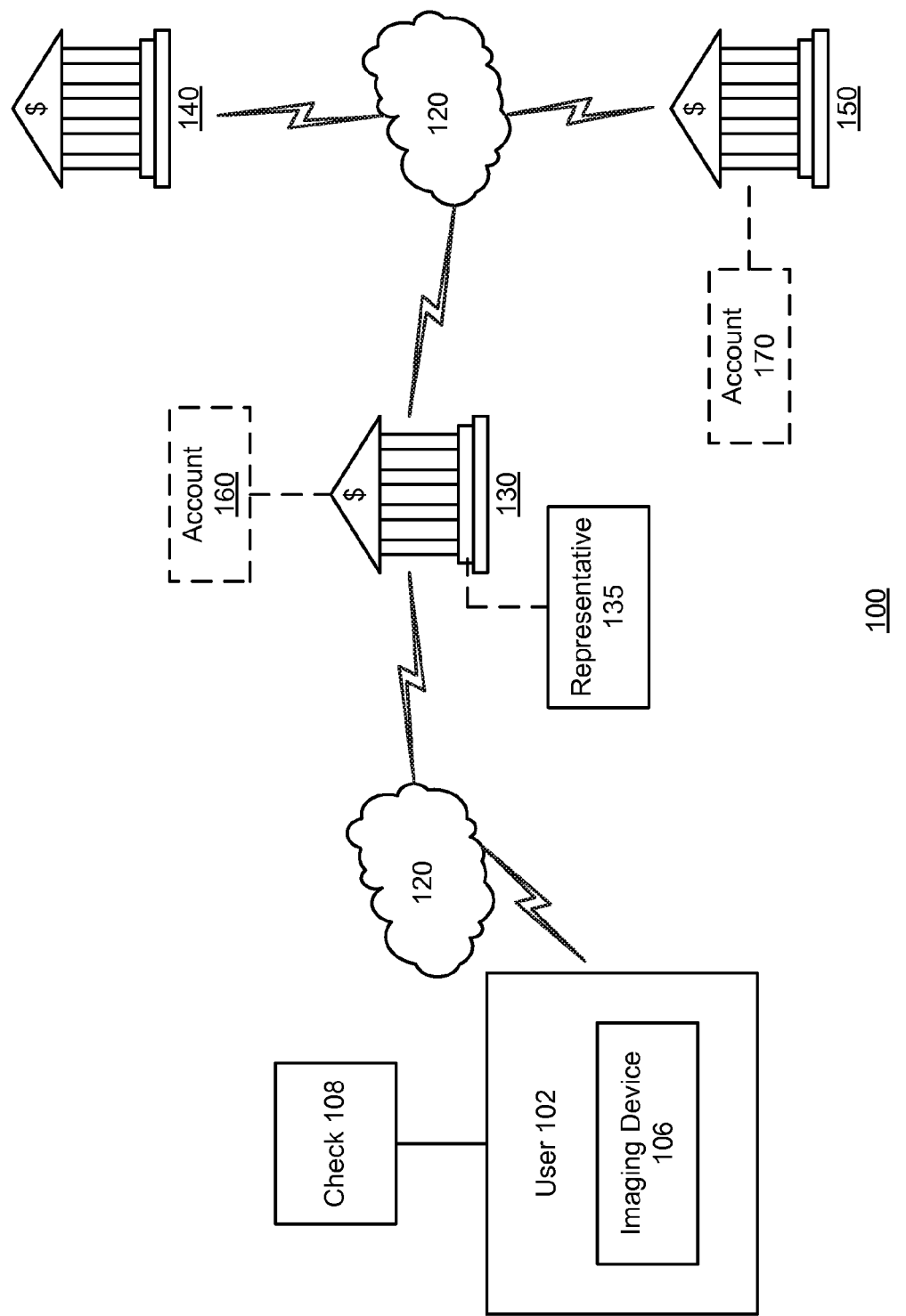
FIG. 1 is a block diagram of an implementation of a system in which example embodiments and aspects may be implemented.

FIG. 1 is a block diagram of an implementation of a system 100 in which example embodiments and aspects may be implemented. System 100 may include an account owner, referred to herein as a user 102, and financial institutions 130, 140, and 150, which may be any type of entity capable of processing a transaction involving a negotiable instrument, such as processing checks and/or providing funds associated with checks. For example, each of the financial institutions 130, 140, and 150 may be a financial services institution such as a retail bank, an investment bank, an investment company, a regional branch of the Federal Reserve, a clearinghouse bank, and/or a correspondent bank.

A negotiable instrument typically includes a type of contract that obligates one party to pay a specified sum of money to another party. Negotiable instrument as used herein is an unconditioned writing that promises or orders payment of a fixed amount of money. One example of a negotiable instrument is a check. The check may be taken by the receiving party and deposited into an account at a financial institution of the receiving party. The receiving party may endorse the check and then present it for deposit at a bank branch, via an automated teller machine (ATM), or by using remote deposit. Other examples of negotiable instruments include money orders, cashier's checks, drafts, bills of exchange, promissory notes, and the like. A money order is a trusted financial instrument that is a payment order for a pre-specified amount of money. A cashier's check (also known as a bank check, official check, teller's check, bank draft or treasurer's check) is a check guaranteed by a bank and may be purchased from a bank.

Figure 2:
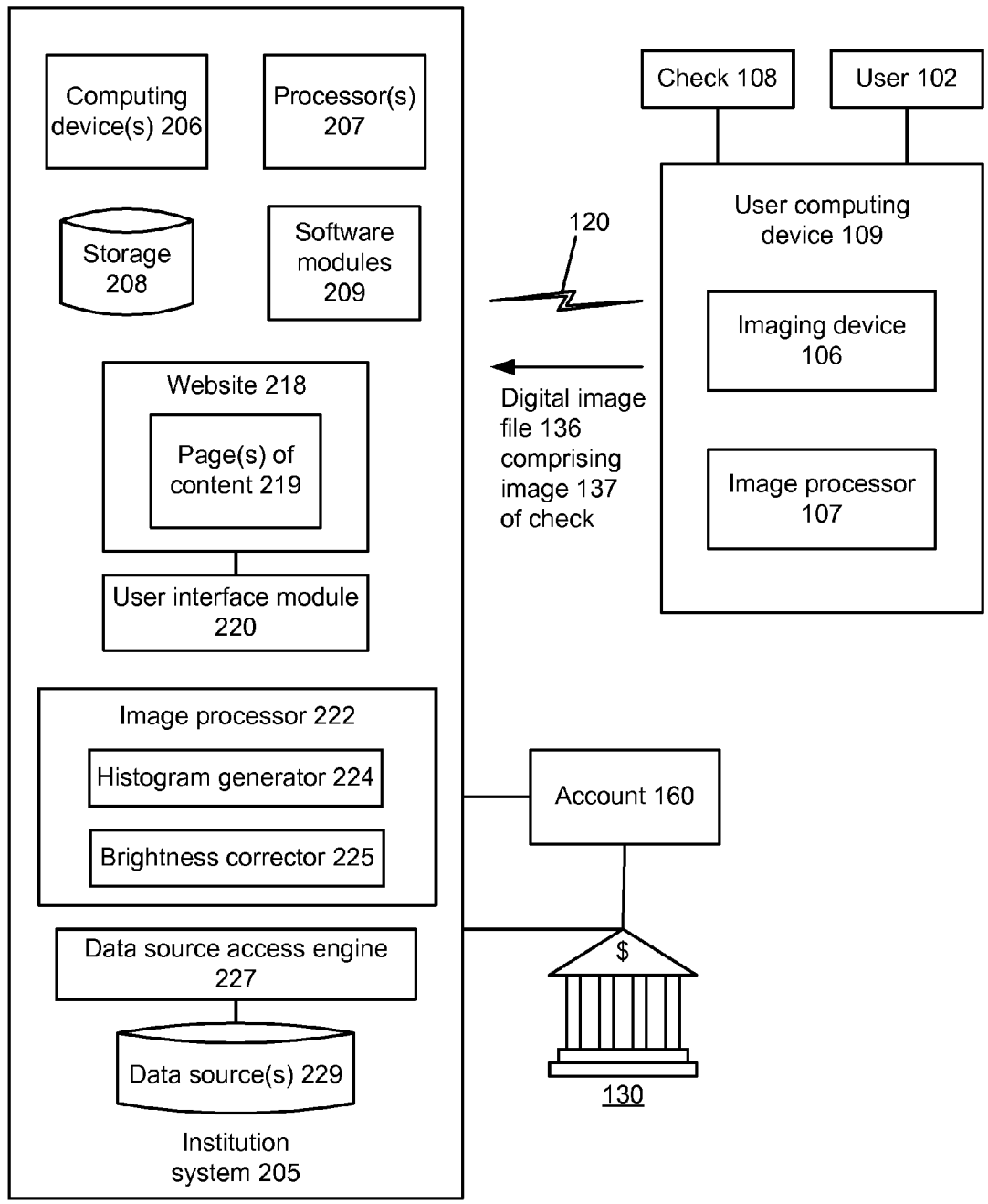
FIG. 2 is a block diagram of another implementation of a system in which example embodiments and aspects may be implemented.

The user 102 may be an individual or entity who owns account 160 that may be held at financial institution 130 and is accessible via an institution system 205, described further with respect to FIG. 2. Account 160 may be any type of deposit account for depositing funds, such as a savings account, a checking account, a brokerage account, and the like. The user 102 may deposit a check 108 or other negotiable instrument in the account 160 either electronically or physically. The financial institution 130 may process and/or clear the check 108 or other negotiable instrument. The user 102 may communicate with financial institution 130 by way of communications network 120 such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 102 may communicate with financial institution 130 by phone, email, instant messaging, text messaging, web chat, facsimile, mail, and the like. Financial institutions 130, 140, and 150 also may communicate with each other by way of communications network 120.

In an implementation, the user 102 may receive payment from another individual such as a payor in the form of a check 108 or other negotiable instrument that is drawn from account 170 at financial institution 150. The user 102 may endorse the check 108 (e.g., sign the back of the check 108) and indicate an account number on the check 108 for depositing the funds. It is noted that although examples described herein may refer to a check, the techniques and systems described herein are contemplated for, and may be used for, deposit of any negotiable instrument. Similarly, the techniques and systems described herein are contemplated for and may be used with any form or document whose image may be captured with a scanner, camera, or other imaging device for subsequent storage and/or processing.

As described further herein, a digital image of a check or other negotiable instrument may be provided from a user to a financial institution, and the digital image may be processed and funds associated with the check or negotiable instrument in the digital image may be deposited in a user's bank account. The user 102 may deposit the check 108 into account 160 by making a digital image of the check 108 and sending the image file containing the digital image to financial institution 130. For example, after endorsing the check 108, the user 102 may use an imaging device 106 that comprises a camera to convert the check 108 into a digital image by taking a picture of the front and/or back of the check 108. The imaging device 106 may be a scanner, a camera, a video camera, a web camera, a mobile phone (also known as a wireless phone or a cellular phone), a personal digital assistant (PDA), or any computing device capable of capturing an image of a negotiable instrument, for example.

In an implementation, the user 102 may send the digital image(s) to financial institution 130 using the imaging device 106 or a computing device associated with the imaging device. Any technique for sending a digital image to financial institution 130 may be used, such as providing a digital image to a website associated with financial institution 130 from storage, emailing a digital image to financial institution 130, or sending a digital image in a text message or instant message, for example.

Financial institution 130 may receive a digital image representing the check 108 and may use image processing software or other application(s) to obtain the relevant data of the check 108 from the digital image. Image processing may comprise corner detection, perspective correction, and cropping, for example, using any known techniques. Brightness correction may also be performed to enhance the image. As described further herein, brightness correction may include placing a dark (e.g., black) reference mark, such as a cross for example, on the check image, which provides an absolute black reference so that the other color levels may be more easily ascertained (e.g., using a histogram) and adjusted to generate a bi-tonal image which can be read by a financial institution's image processor more easily.

Financial institution 130 may determine whether the financial information associated with the check in the processed image may be valid. For example, financial institution 130 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image from the user 102.

The electronic devices may receive the digital image and may perform an analysis on the quality of the digital image, the readability of the data contained therein, or the like. For example, the electronic devices may determine whether the account number, amount payable, and the like may be readable such that it may be parsed or otherwise obtained and processed by the financial institution 130 to credit an account 160 associated with the user 102 and debit an account associated with the payor. In an implementation, a representative 135 of financial institution 130 may provide assistance to the user 102 and may provide assistance in determining whether the financial information may be readable and/or of a good enough quality to be processed, as described further herein.

Upon receipt, processing, and approval of the digital image, financial institution 130 may credit the funds to account 160. In an implementation, financial institution 130 may process data from the check 108 using data obtained from the digital image, such as financial information and other information from the check 108 (e.g., place of issue, check number, date of issue, payee, amount of currency, signature of the payor, routing/account number in MICR (magnetic ink character recognition) format, transit number, etc.).

Financial institution 130 may clear the check 108 by presenting the processed image (which has been processed with brightness correction) to an intermediary financial institution, such as a regional branch of the Federal Reserve, a correspondent bank, and/or a clearinghouse bank. A financial institution receiving the processed image from financial institution 130 may obtain the data pertaining to the check 108 from the processed image.

In an implementation, the check 108 may be cleared by presenting the processed image to financial institution 140, which may be a regional branch of the Federal Reserve, along with a request for payment. Financial institutions 130 and 150 may have accounts at the regional branch of the Federal Reserve. Upon receiving the processed image, financial institution 140 may identify financial institution 150 as the paying bank (e.g., the bank from which the check 108 is drawn). This may be accomplished using a nine-digit routing number located on the bottom left hand corner of the check. A unique routing number is typically assigned to every financial institution in the United States. Financial institution 140 may present the processed image (or a substitute check generated using the processed image) to financial institution 150 and request that the check be paid. If financial institution 150 verifies the check (i.e., agrees to honor the check), financial institution 140 may then settle the check 108 by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check 108 may be cleared internally.

FIG. 2 is a block diagram of another implementation of a system in which example embodiments and aspects may be implemented. The user 102 is shown along with an institution system 205. The institution system 205 may be affiliated with financial institution 130. The user 102 may access the financial institution 130 via the institution system 205 by opening a communication pathway via the communications network 120 using a user computing device 109. There may be several ways in which the communication pathway may be established, including, but not limited to, an Internet connection via a website 218 of the institution system 205. The user 102 may access the website 218 and log into the website 218 using credentials, such as, but not limited to, a username and a password.

The user 102 may use the imaging device 106 to generate a digital image of the check 108. The digital image may be used to create a digital image file 136 that may be sent to the institution system 205 and used by the financial institution 130, in conjunction with the institution system 205, to process a deposit of the check 108 whose image 137 is comprised within the digital image file 136. In an implementation, the digital image file 136 may be augmented by secondary data which may be information relating to the deposit of the check 108, such as an account number and a deposit amount, for example.

The user 102 may place the check 108 on a background and generate a digital image comprising an image of the check 108 (e.g., a check image) and a portion of the background (e.g., a background image) using the imaging device 106 that may be standalone or part of a phone or other user computing device. Any background may be used. It is noted that although examples and implementations described herein may refer to a check image and check data, the term "check image" may refer to any foreground image in a digital image (as opposed to the background image) and the term "check data" may refer to any foreground data in a digital image (as opposed to background data such as background data). Thus, the "check image" and the "check data" may refer to the foreground image and foreground data in implementations involving any negotiable instrument, form, or document. In an implementation, the digital image generated by the imaging device 106 comprises check data and background data. The check data pertains to the check image in the digital image and the background data pertains to the background image in the digital image on which the image of the check 108 is displayed.

The user 102 may thus generate a digital image of the check 108 using the imaging device 106, in an implementation. For example, after endorsing the check 108, the user 102 may use a device such as the imaging device 106 and/or the user computing device 109 for example, to make a digital image of the front sides and/or back sides of the check 108 and to store the digital image(s) in a digital image file. The images of the front side and the back side of the check 108 may be processed using the techniques described herein. The images may be processed as separate files or as images in single file. The images of the front side and the back side of the check 108 may be captured sequentially, e.g., pursuant to the user 102 flipping the check 108 over after an image of the front of the check 108 has been captured.

The digital image file 136 comprising an image 137 of the check may be transmitted to the institution system 205. The user 102 may send the digital image file 136 and any secondary data to the institution system 205 along with a request to deposit the check 108 into an account, such as the account 160. In an implementation, the user 102 may attach the digital image file 136 to an email and send the digital image file 136 to the institution system 205 using the same device used to make the digital image file 136 of the check 108 or another computing device. However, any technique for sending a digital image file 136 to the institution system 205 may be used, such as providing a digital image file 136 from storage to the website 218 associated with the institution system 205.

The financial institution 130 in conjunction with the institution system 205 may process the deposit request according to the digital image file 136 and any secondary data. Thus, the financial institution 130 in conjunction with the institution system 205 may process the digital image file 136 comprising the image 137 of the check 108 for deposit.

In an implementation, the institution system 205 may comprise an image processor 222 that processes the digital image file 136 received from the user computing device 109. In an implementation, the institution system 205 may retrieve the image 137 of the check 108 from the digital image file 136 and process the check 108 from the image 137 for deposit. The image processor 222 may comprise any known image processing technology, software, or other application(s) to perform operations on the image 137 of the check 108 such as deskewing, dewarping, magnetic ink character recognition, cropping (either automatically, or having the user 102 manually identify the corners and/or edges of the check 108 for example), reducing the resolution of the image, number detection, character recognition, and the like. The image processor 222 may comprise a grayscale converter that may convert the digital image generated by the imaging device 106 to grayscale using known techniques. In photography and computing, a grayscale digital image is an image in which the value of each pixel is a single sample, that is, it carries only intensity information. Images of this sort are composed exclusively of shades of gray, varying from black at the weakest intensity to white at the strongest. Conversion of a color image to grayscale is well known and any known technique(s) may be used.

The image processor 222 may also perform brightness correction on the image, e.g., after it has been processed for deskewing, dewarping, edge detection, etc. As described further with respect to FIGS. 3, 4, and 9, for example, a black reference mark may be superimposed (e.g., overlaid) on the image of the check 108 (that has been processed thus far), a histogram of the image may be generated using a histogram generator 224, and the brightness of the image may be corrected (if appropriate) using a brightness corrector 225 and the histogram. A histogram is a well known graph and may be used to display where all of the brightness levels contained in an image are found, from the darkest to the brightest. These values may be provided across the bottom of the graph from left (darkest) to right (brightest). The vertical axis (the height of points on the graph) shows how much of the image is found at any particular brightness level. An example histogram is further described with respect to FIG. 4.

After the image has been brightness corrected, any image processing technology, software, or other application(s) may be used to obtain the relevant data of the check 108 from the brightness corrected image. The institution system 205 may determine whether the financial information associated with the check 108 may be valid.

In an implementation, the image processor 222 may process multiple frames of the image if the image is comprised of multiple frames (e.g., the front side and the back side of a check). For example, after receiving the digital image file 136, the image processor 222 may retrieve the image(s) 137 of the check 108 and process (e.g., dewarp, deskew, edge detect, brightness correct, etc.) the image 137 or an image based on the image 137 for deposit. The image processor 222 has access to data, files, and documents pertaining to the user 102 as well as any other data, files, and documents that are internal or external to the institution system 205 that may be useful in processing the digital image file 136 and/or the data contained therein.

Upon receipt and processing of the digital image file 136 and approval of the check 108 associated therewith, the financial institution 130 may credit the funds of the check 108 to the account 160.

The user computing device 109 may be integral with the device used to make the digital image of the check 108 and/or the digital image file 136 or separate from the device used to make the digital image of the check 108 and/or the digital image file 136. The user computing device 109 may be a personal computer (PC), a handheld computing device, a PDA, a mobile phone, or a smartphone, for example. The user computing device 109 may comprise the imaging device 106. An example user computing device 109 is described with respect to FIG. 11.

In an implementation, the user computing device 109 may be a mobile computing device (such as a handheld computing device, a PDA, a mobile phone, a smart phone, a portable PC, etc.) that comprises a camera which can capture a digital image of the check 108 by taking a picture of the front and/or back of the check 108. The back of the check 108 may provide endorsement verification, such as the signature of the person or party the check 108 is made out to. The user 102 may send the digital image file 136 to the institution system 205 using the mobile computing device. It is contemplated that any device that is capable of generating a digital image may be used to make a digital image of the check 108 which may be processed as described herein for sending to the institution system 205 as a digital image file 136. Additionally, a video source may be used to capture a video that may be processed at the user computing device 109 and/or the institution system 205 in accordance with the operations described herein. Such a video source may include a video camera, a web camera, or a video-enabled phone. A live video or a stored video of the check 108 may be captured, processed, and/or transmitted to the institution system 205 for deposit of the check 108.

In an implementation, the user computing device 109 may comprise an image processor 107 that may process the image generated by the imaging device 106. The image processed by the image processor 107 may be provided to the institution system 205 in the digital image file 136 as the image 137. The image processor 107 may use any known image processing technology, software, or other application(s) to perform operations on the image of the check 108 generated by the imaging device 106 such as deskewing, dewarping, cropping, and/or edge detection, for example. In an implementation, as described further with respect to FIG. 10 for example, the image processor 107 may overlay a black reference mark on the image of the check 108 (that has been processed by the image processor 107 thus far) and generate a histogram of the image. A threshold point may be determined using the histogram and the processed image and the threshold information (or brightness information based on the threshold information) may be sent to the institution system 205 for brightness correction of the image as appropriate.

The institution system 205 may include a user interface module 220 and a data source access engine 227. The user interface module 220 may generate and format one or more pages of content 219 as a unified graphical presentation that may be provided to the user computing device 109. In an implementation, the page(s) of content 219 may be provided to the user computing device 109 via a secure website 218 associated with the institution system 205.

The institution system 205 has the ability to retrieve information from one or more data sources 229 via the data source access engine 227. Data pertaining to the user 102 and/or the user account 160 and/or processing and clearing of a check may be retrieved from data source(s) 229 and/or external data sources. The retrieved data may be stored centrally, perhaps in storage 208. Data source(s) 229 may contain data, metadata, email, files, and/or documents that the institution system 205 maintains pertaining to the user 102, such as personal data such as name, physical address, email address, etc. and financial data such as credit card numbers and deposit account numbers. Such data may be useful for processing the digital image file 136. Additionally or alternatively, the financial institution 130 or the institution system 205 may access this information when processing or clearing a check. Other information may be provided to the institution system 205 from the user 102.

The user computing device 109 may provide access to a system which is coupled to the institution system 205. A system may be configured to format and transmit a graphical user interface to the user 102, and through the graphical user interface provide the user 102 the ability to interact with information that may be maintained, requested, and/or provided by the institution system 205. As mentioned above, the institution system 205 may provide a unified graphical presentation output. In an implementation, the unified graphical presentation is combined with other materials and transmitted to the user 102. A user access system may be implemented as a web server in an implementation. The user access system, through the use of any suitable interactive web technology, provides an interactive experience to the user 102 through which access to check processing and clearing data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 205 may comprise one or more computing devices 206. The computing device(s) 206 may have one or more processors 207, storage 208 (e.g., storage devices, memory, etc.), and software modules 209. The computing device(s) 206, including processor(s) 207, storage 208, and software modules 209, may be used in the performance of the techniques and operations described herein. Examples of software modules 209 may include modules that may be used in conjunction with receiving and processing a digital image file 136 comprising an image 137 of the check 108, retrieving data from the digital image file 136, performing brightness correction on an image obtained from the digital image file 136, generating web page content for display, and receiving instructions from the user 102, for example. While specific functionality is described herein as occurring with respect to specific modules, the functionality may likewise be performed by more, fewer, or other modules. An example computing device and its components are described in more detail with respect to FIG. 11.

Figure 3:
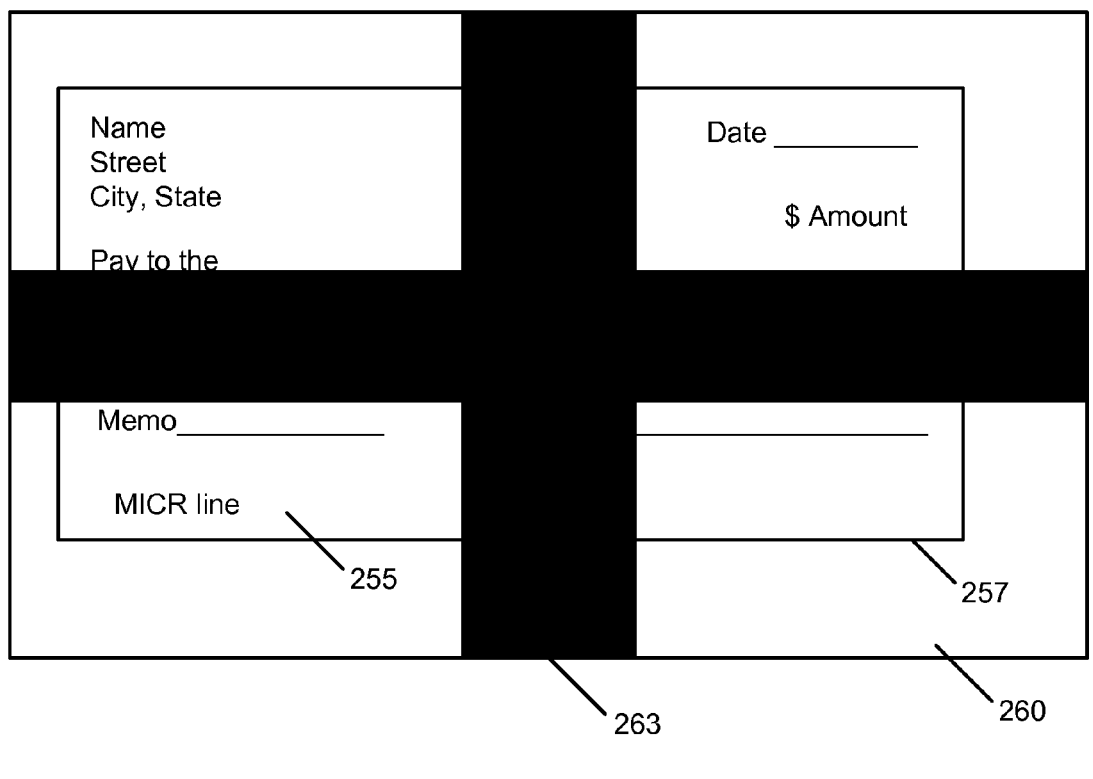
FIG. 3 is a diagram of an example image comprising check data, background data, and a reference mark that may be used with brightness correction.

FIG. 3 is a diagram of an example image 250 comprising check data 255 (associated with a check image), background data 260 (associated with a background image), and an overlaid reference mark 263 that may be used with brightness correction. The image 250 may have been generated by an imaging device associated with the user computing device 109, such as the imaging device 106, and then processed for dewarping, deskewing, edge detection etc. The image 250 comprises check data 255 that is associated with the check 108. The image 250 also comprises background data 260 that is associated with the portion of the image that is not associated with the check 108 (e.g., the background on which the check 108 was placed when the image 250 was generated by the imaging device 106). An edge 257 separates the check data 255 from the background data 260. The edge 257 may be detected using known techniques.

The reference mark 263 may be overlaid on the thus far processed image such that it covers a portion of the check data 255 and the background data 260. Although the reference mark 263 is shown as a cross shape, the reference mark 263 may take any shape (e.g., one or more horizontal lines, one or more vertical lines, any pattern, etc.), and have any area, subject to a constraint that the reference mark 263 overlays a portion of the check data 255 and a portion of the background data 260 (if any) separated by a portion of the edge 257 in an implementation. In this manner, distinct areas of density corresponding to the image (e.g., the check data and the background data) and the reference mark overlaid on the image may be provided in a histogram. Light tends to vary from quadrant to quadrant on a check image, and thus a cross may be used to divide the image 250 into quadrants. In an implementation, with the reference mark 263 having a cross shape, the width and height of the cross may be determined based on the width and the height of the image 250, for example. In an implementation, the height may be approximately twice as large as the width, for example.

Figure 4:
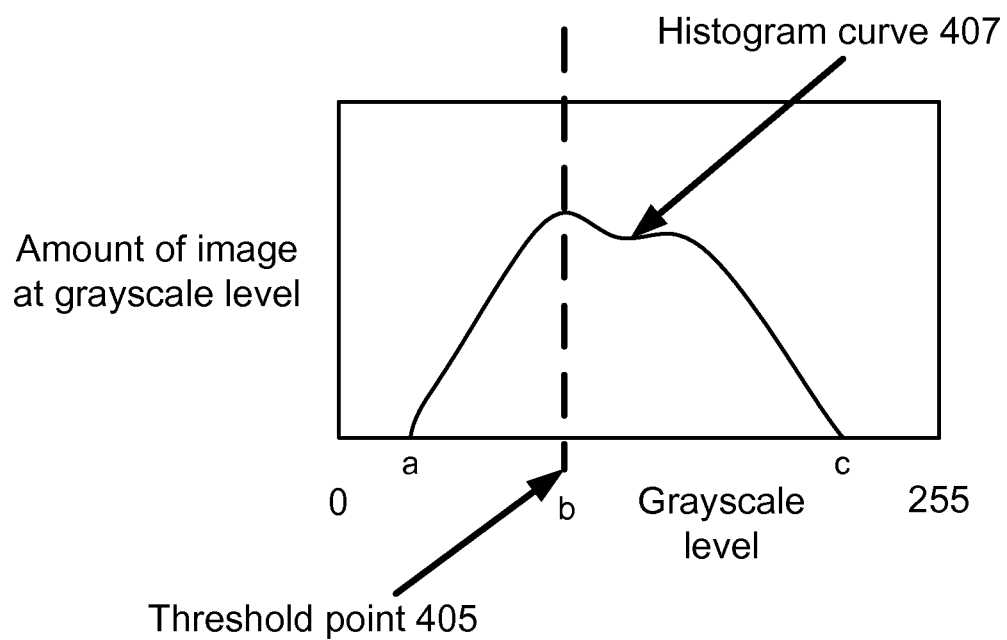
FIG. 4 is a diagram of an example histogram for an image comprising check data, background data, and a reference mark.

A histogram may be generated for the image and used in brightness correction. FIG. 4 is a diagram of an example histogram 400 for an image comprising check data, background data, and a reference mark such as those of FIG. 3. The horizontal axis of the histogram 400 represents the grayscale level between 0 and 255, where 0 represents true black and 255 represents true white. The vertical axis represents the amount of the image at a particular grayscale level of the horizontal axis. Any known technique for generating a histogram for a grayscale image may be used.

A threshold point 405 (or threshold level) on the histogram may be determined and compared to a predetermined constant value to determine the amount of brightness correction, if any, that is to be applied to the image of the check. Depending on the implementation, the threshold point may be a predetermined location on the histogram curve 407, such as the minimum grayscale level (e.g., point a, corresponding to the beginning point of the curve 407), the highest amount level shown by the curve 407 (e.g., point b, corresponding to the peak of the curve 407), or the maximum grayscale level (e.g., point c, corresponding to the ending point of the curve 407).

In an implementation, if the threshold point 405 is above a predetermined constant value, then an intensity (or brightness) may be added to each of the pixels as brightness correction; otherwise no intensity (or brightness) is added to the pixels of the image. Thus, for example, for an image of a check that is bright, there may be no change (e.g., no brightness is added), and for a dark check (e.g., not enough contrast between the check data and the background data), some brightness may be added. Data may then be obtained more easily from the image of the check. The amount of intensity or brightness that may be added may be a percentage, such as to make each pixel 10 percent brighter, 20 percent brighter, etc., or may be a fixed amount of brightness such that each pixel receives the same amount of additional brightness.

Figure 5:
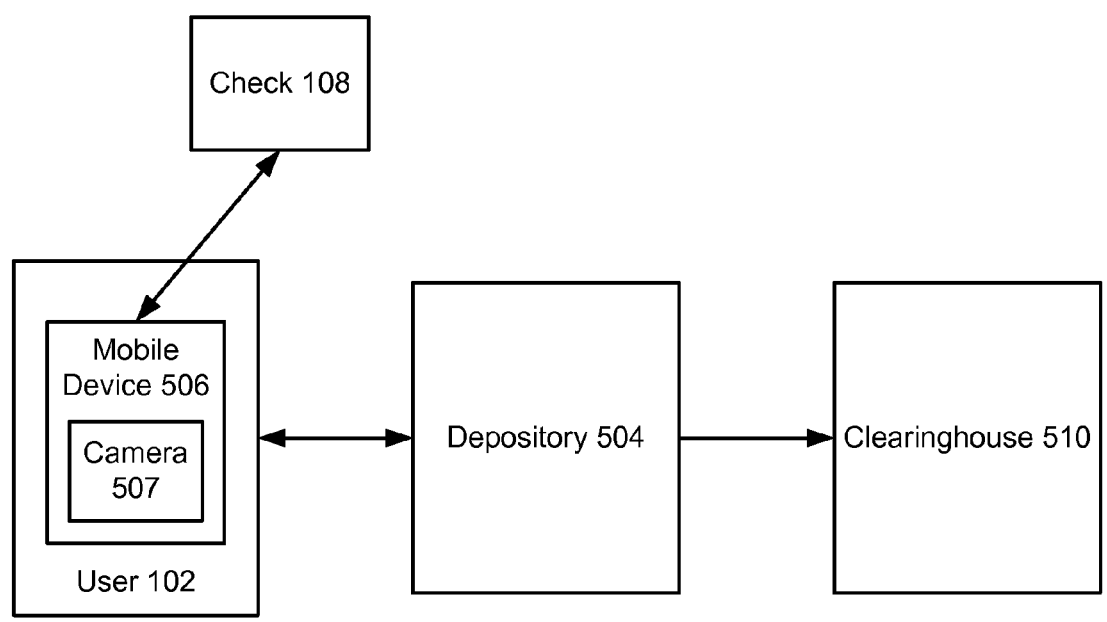
FIG. 5 shows a high-level block diagram of an implementation of a system that may be used for the deposit of a negotiable instrument.

FIG. 5 shows a high-level block diagram of an implementation of a system 500 that may be used for the deposit of a negotiable instrument. In an implementation, the user 102 may deposit the funds of a negotiable instrument, such as the check 108, using the camera functionality in the mobile device 506. In the example of one person giving a check to another person, this would enable the receiving party to deposit the funds at that time, without physically visiting an ATM or a bank branch.

In an implementation, the system 500 may include the user 102 and a depository 504. The mobile device 506 may comprise a camera 507, such as a digital camera. Such a mobile device may be called a camera phone. The mobile device 506, through the camera 507, has the ability to take or capture a picture or digital image of the check 108 or other negotiable instrument. In an implementation, the camera 507 may take an image of the front of the check 108. Alternatively, the camera 507 may take an image of both the front and the back of the check 108.

The depository 504 may include a bank in which the user 102 has a deposit account; however, the present disclosure is not limited to just banks. Alternatively, a third party may act as the depository 504 providing functionality to a plurality of users without regard to the bank at which they have deposit accounts, or whether their individual bank allows for the methods and systems described herein. The depository 504, in an implementation, after receiving the image(s) of the check 108 from the user 102, may use a clearinghouse 510 to perform the check clearing operations. Check clearing operations are used by banks to do the final settlement of the check 108, such as removing funds from the account of the payor and transferring those funds to the user's bank.

Figure 6:
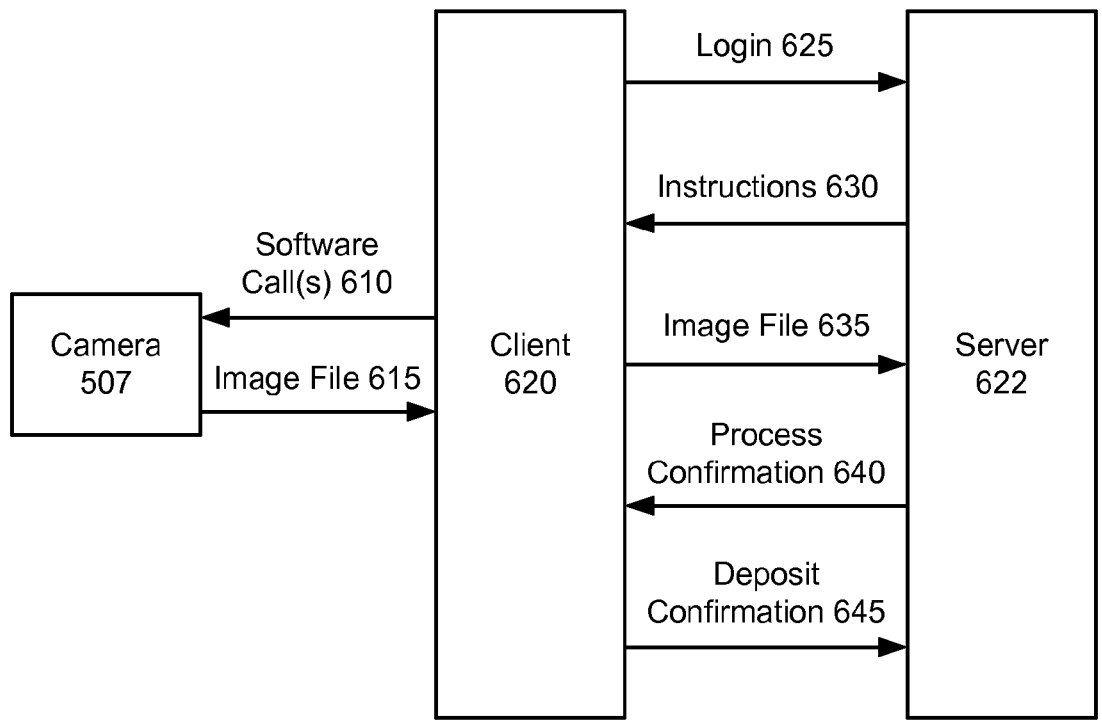
FIG. 6 shows a data flow diagram of a system for the deposit of a negotiable instrument, in accordance with an example embodiment.

FIG. 6 shows a data flow diagram 600 of a system for the deposit of a negotiable instrument, in accordance with an example embodiment. A client 620 is one example of the mobile device 506 or the user computing device 109. In an implementation, a server 622 may be a software component operable by the depository 504.

The client 620 may log in to a remote deposit system executed on the server 622. The login 625 may serve to authenticate the user 102 as an authorized consumer of the depository 504. The server 622, in one example, may send instructions 630 to the client 620 that execute an application on the client 620. This may include instructions that cause a software object, which may have been previously downloaded and installed on the client 620, to be executed on the client 620. In another example, the instructions 630 may include a wholly self-contained application that when delivered to the client 620 will execute and perform one or more operations described herein. In either example, the software object may be configured to make one or more software calls 610 to a digital camera, such as the camera 507, or other imaging device, associated with the mobile device 506 or the user computing device 109. This may be through specific software instructions to the camera or imaging device.

In an alternate example, the software object may operate through a software abstraction layer, such as an application programming interface (API). The software object developer may only insert code into the software object to call one or more APIs exposed by the software operating the mobile device. One example of such software is Windows Mobile by Microsoft Corporation. In the context of a Windows Mobile device, the Windows Mobile operating system (OS) has one or more APIs exposed to application developers that will translate instructions from applications into instructions operable by the camera 507 on the mobile device 506. A mobile operating system, also known as a mobile platform or a handheld operating system, is the operating system that controls a mobile device. Other mobiles OSs include Symbian OS, iPhone OS, Palm OS, BlackBerry OS, and Android.

The software object may cause the camera 507 to take a picture or capture one or more images of the check 108 being deposited. Each side of the check 108 may be captured by the camera 507 using similar API calls. The images may be stored in an image file 615.

Once the images of one or both sides of the check 108 are captured by the camera 507, in an implementation, the image file 615 may be operated on by the software object of the client 620. These operations may include any of the following: deskewing, dewarping, cropping, edge detection, etc., for example. The operation of generating and analyzing a histogram for brightness correction may also be performed by the client 620 and information pertaining thereto may be provided to the server 622.

The image may be also down converted into a grayscale or black and white image, such as either in Joint Photographic Experts Group (JPEG) compliant format or in tabbed image file format (TIFF) for example. In an alternate example, the image may be formatted as a Scalable Vector Graphics (SVG) image. One of the benefits of an SVG file is a large size advantage over JPEG. In the former example, the image at some point before entry into the clearing system may be converted to TIFF format. In an implementation, this may be performed at the mobile device 506, wherein the camera 507 captures the image in TIFF format. However, the camera 507 of the mobile device 506 may capture the image in JPEG format, which may then be converted into TIFF either at the mobile device 506 or at the server 622. In the latter example, this may use the transmission of the TIFF image across a communications network which may be more advantageous as TIFF images are typically smaller in file size for the same size of picture as a JPEG formatted image.

The software object on the client 620 may operate by performing one or more of the operations described herein and then transmitting an image file 635 (e.g., based on image file 615 that has been processed) to the server 622 after the user 102 confirms that they do wish to deposit the check 108. Alternately, the software object may capture the image of the check 108 and transmit that image to the server 622 that in turn may perform those operations, verifies that the image quality is within acceptable thresholds, and communicates that verification back to the client 620, which can then instruct the user 102 to take a picture of the other side of the check 108. In this example, the image transmitted to the server 622 may be in any format, such as JPEG or TIFF, insofar as the server software has the ability to convert that image into a Check 21 compliant format. Alternately, the bank may output an X9.37 file to the clearing system. The Check Clearing for the 21st Century Act (or Check 21 Act) is a United States federal law that allows the recipient of a paper check to create a digital version, thereby eliminating the need for further handling of the physical document. The Check 21 standard for electronic exchange is defined in the standard DSTU X9.37-2003 ("X9.37"). It is a binary interchange format.

The server 622 may confirm (e.g., using a process confirmation 640) with the user 102 the transmission, reception, and processing of each side of the check 108 separately, or may confirm both sides at the same time. On the server side, more operations may be performed, such as brightness correction. Where to perform these operations may be determined by the processing power of the mobile device 506 itself, which is typically limited in computational power. However, the present discussion is not limited in any way by discussion of where certain operations are described as operating. The operations of detecting and verifying information may be performed by the client 620 before the information is transmitted along with the image in the image file 635 to the server 622. Alternately, the software object operating on the mobile device 506 may perform no operation other then capturing images of the front and back of the check 108, receiving confirmation that the user 102 wishes to proceed, and transmitting those images to the server 622, wherein the server 622 performs those operations.

In an implementation, after the image file 635 has been received by the server 622, the server 622 may send a process confirmation 640 to the client 620. The process confirmation 640 may request instructions from the client 620 to continue proceeding with the deposit now that the server 622 has received the image file 635. In response, the client 620 may send a deposit confirmation 645 to the server 622, instructing the server 622 to process the deposit of the check based on the image file 635 that had been received by the server 622.

Figure 7:
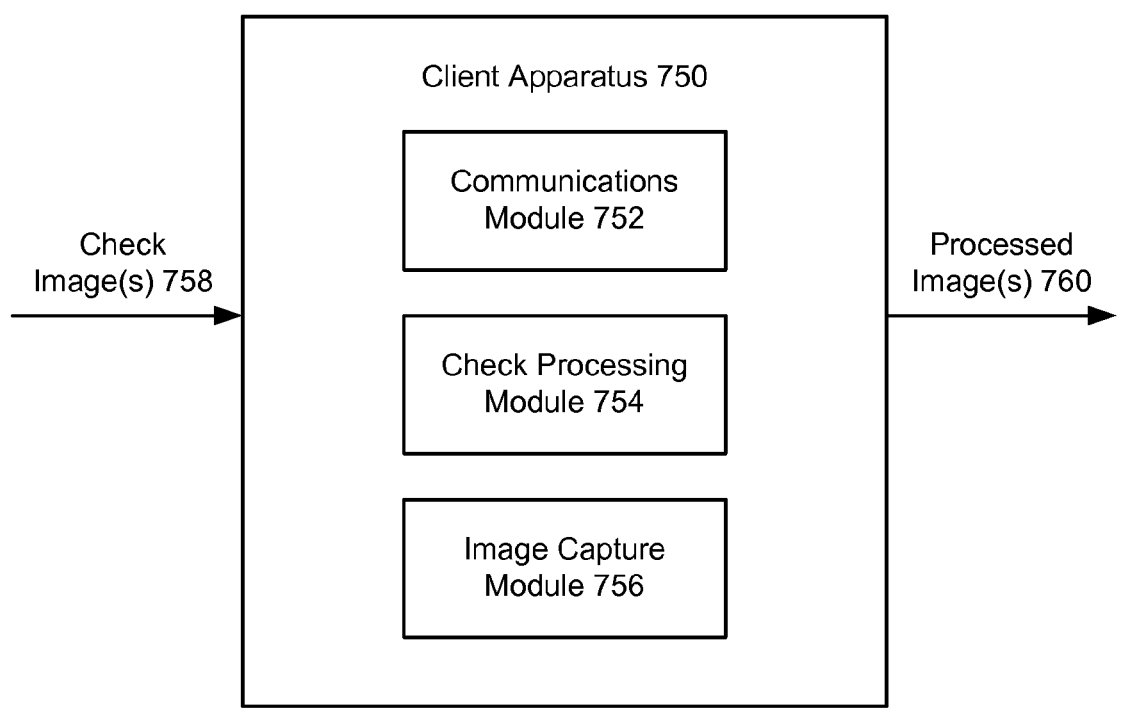
FIG. 7 shows a block diagram of a client apparatus for the deposit of a negotiable instrument, in accordance with an example embodiment.

FIG. 7 shows a block diagram of a client apparatus 750 for the deposit of a negotiable instrument, in accordance with an example embodiment. The client apparatus 750 may include one or more software objects operating on the mobile device 506 or other user computing device. The client apparatus 750 may include a communications module 752, a check processing module 754, and an image capture module 756. The client apparatus 750 may receive, in one example, one or more check images 758 as an input and output one or more processed images 760.

In an implementation, the check image(s) 758 may be received following a software call from the check processing module 754 to the image capture module 756. In such an implementation, the image capture module 756 may include the camera 507 contained within the mobile device 506. Alternately, the camera 507 may be detachably coupled to the mobile device 506 such as through a secure digital (SD) slot or over any suitable communications bus, such as USB (universal serial bus). In an implementation, the image capture module 756 may retrieve previously captured and stored image files (e.g., in local, remote, or removable storage associated with the client apparatus 750) and send the image files to a financial institution (e.g., financial institution 130, the server 622, the server apparatus 870 of FIG. 8, etc.) for processing. In an implementation, the client apparatus 750 may comprise a browser such as a web browser, for accessing a website on the Internet or other network associated with a financial institution. The user may access the website and select a "capture image" link or similar icon, button or link, for example, displayed on the browser. Such a selection may call the image capture module 756 on the client apparatus 750.

The communications module 752 may be configured, in one example, to receive and send data signals over a suitable communications network. This may include, without limitation, GSM/GPR3, HSDPA, CDMA, TDMA, 802.11, 802.16 and the like. While the bandwidth available to the mobile device 506 may be an implementation concern such discussion is outside the scope of the present discussion and any suitable wireless communications network is considered to be within the scope of the present discussion. With respect to the present discussion, the communications module 752 may receive one or more processed check images 760 from the check processing module 754 and may transmit them over the suitable communications network to the depository 504.

The check processing module 754 may be configured, in one example, to cause the image capture module 756 to capture a digital image of at least one side of a check. The check processing module 754 may then perform one or more processing operations on the image of the check. These processing operations, at a high level, are intended to ensure that the image of the check is suitable for one or more subsequent processing tasks. For instance, if the check is rotated 45 degrees clockwise when captured, the check processing module 754 or a software object operated on the server 622 may be unable to optically detect information on the check. In this example, the check processing module 754 may deskew the image such that the image was no longer rotated.

Another aspect of an image that may be processed is a warping of the image. Warping, as used herein, is meant to denote that the check is tilted forward or back with respect to a plane that is perpendicular to a line drawn from the camera lens to the center of the check. Warping, or tilting, of the image may also lead to incorrect optical detection of the check. In an implementation, the check processing module 754 may dewarp the check image such that, in a three-dimensional space, the check would appear to be perpendicular to an imaginary line drawn from the center of the camera lens to the center of the check itself. A warping transformation algorithm (e.g., which may be exposed as a software call) may be used to remove this distortion.

The check processing module 754, in further examples, may perform one or more other cleaning or processing operations. This may include down-converting the image received from the image capture module to a suitable size, such as 200 dots per inch (DPI) resolution or in a resolution range such as 200 DPI to 400 DPI, 300 DPI to 500 DPI, etc., and/or converting the image to grayscale or black and white. Such operation(s) may reduce the file size of the check image.

Alternatively, the check processing module 754 may send instructions to the image capture module 756 to cause the image capture module 756 to capture an image of the check at a suitable resolution. The check processing module 754 may additionally perform any of the following operations, in further examples: convert from JPEG to TIFF, detect check information, perform signature detection on the image of the check, and the like. The check processing module 754 may, alternatively, send the captured check image to the server described herein for such processing, and receive confirmation that the operations were completed before further operations can proceed.

One of the issues with check processing is to detect the presence of a check against whatever background is present. While a user may be instructed to place the check on a dark or black background, such instructions may not provide a positive user experience. Alternatively or additionally, edge detection may be used to detect the check. Edge detection techniques are well known and any suitable method may be used herein. The check processing module 754 may also perform operations used in brightness correction, such as generating and analyzing a histogram of the image of the check with an overlaid reference mark, further described with respect to FIG. 10, for example.

While "flat" is a fairly well known term to users, each user's appreciation of flat with respect to the camera lens of the camera 507 associated with the mobile device 506 may result in a problem with needing to align the check image programmatically or risk rejecting a large number of check images. As the image captured is a set of pixels, a tilted image will result in a jagged polygon rather than a perfect rectangle. Using convex hull algorithms, the check processing module 754 may create a smooth polygon around the boundary and remove the concavity of the check image. Alternatively, a rotating calipers algorithm may be used to determine the tightest fitting rectangle around the check boundary, which can then be used to determine the angle of it, with that angle being used to align the check properly.

If user involvement is tolerated, the user may be queried to supply or identify three of the four corners of the check. In such an operation, the fourth corner may be derived, showing the perimeter of the check. This may allow a software object described herein to use less computational resources in processing the image of the check.

Figure 8:
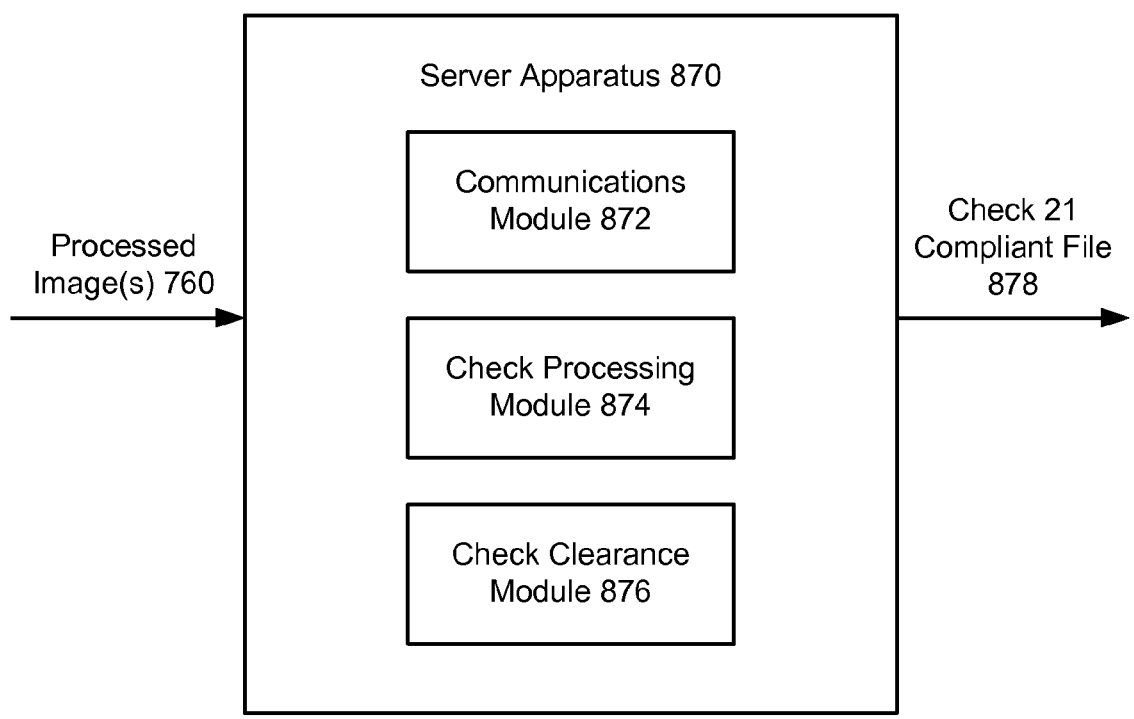
FIG. 8 shows a block diagram of a server apparatus for the deposit of a negotiable instrument, in accordance with an example embodiment.

FIG. 8 shows a block diagram of a server apparatus 870 for the deposit of a negotiable instrument, in accordance with an example embodiment. The server apparatus 870 may include one or more software objects operating on a server operated by the depository 504. The server apparatus 870 may include a communications module 872, a check processing module 874, and a check clearance module 876. The server apparatus 870 may receive one or more processed images 760 from a mobile device 506 or a client apparatus 750 as an input and may output a file such as a Check 21 compliant file 878. The Check 21 compliant file 878 may be a file or entry in a record set that is compliant with the clearinghouse rules set forth in the Check 21 Act and may include outputting an X9.37 file, in one example. The communications module 872 may be configured to receive a wireless communication from the mobile device 506 or user computing device 109 over any suitable communications network.

The check processing module 874 may be configured, in one example, to perform one or more check processing operations on the processed image(s) 760 that are received. In an implementation, these operations may include any of the operations described herein with respect to the check processing module 754. The operation of signature verification may be performed by the check processing module 874 of the server apparatus 870 as the server apparatus 870 may interface with other systems of the depository 504 that may maintain previously verified signature samples of the user 102. Performing signature verification at the client apparatus 750 may be computationally unfeasible; additionally, there may be a security risk if the signature sample is stored on the user's own device.

A cropped grayscale image may be sent to the server apparatus 870. The server apparatus 870 may perform further processing to remove distortion such as warping. The server apparatus 870 may extract information via a TIFF conversion and determine the DPI and re-scale to the proper DPI (e.g., convert to TIFF and detect the DPI that was used in the grayscale image). In an implementation, DPI detection may run on the client apparatus 750. The check processing module 874 may perform brightness correction on the processed image(s) 760, using techniques such as those described with respect to FIGS. 9 and 10.

The check clearance module 876 may be configured, in one example, to receive a file from the check processing module 874 and may communicate with a check clearinghouse such that a Check 21 compliant file 878 may be delivered to the check clearinghouse, such as the clearinghouse 510, and funds may be received by the depository 504. The availability of the funds to the user 102 may be delayed by this operation such that the user 102 only has access to those funds when the depository 504 receives confirmation that the check has cleared.

Figure 9:
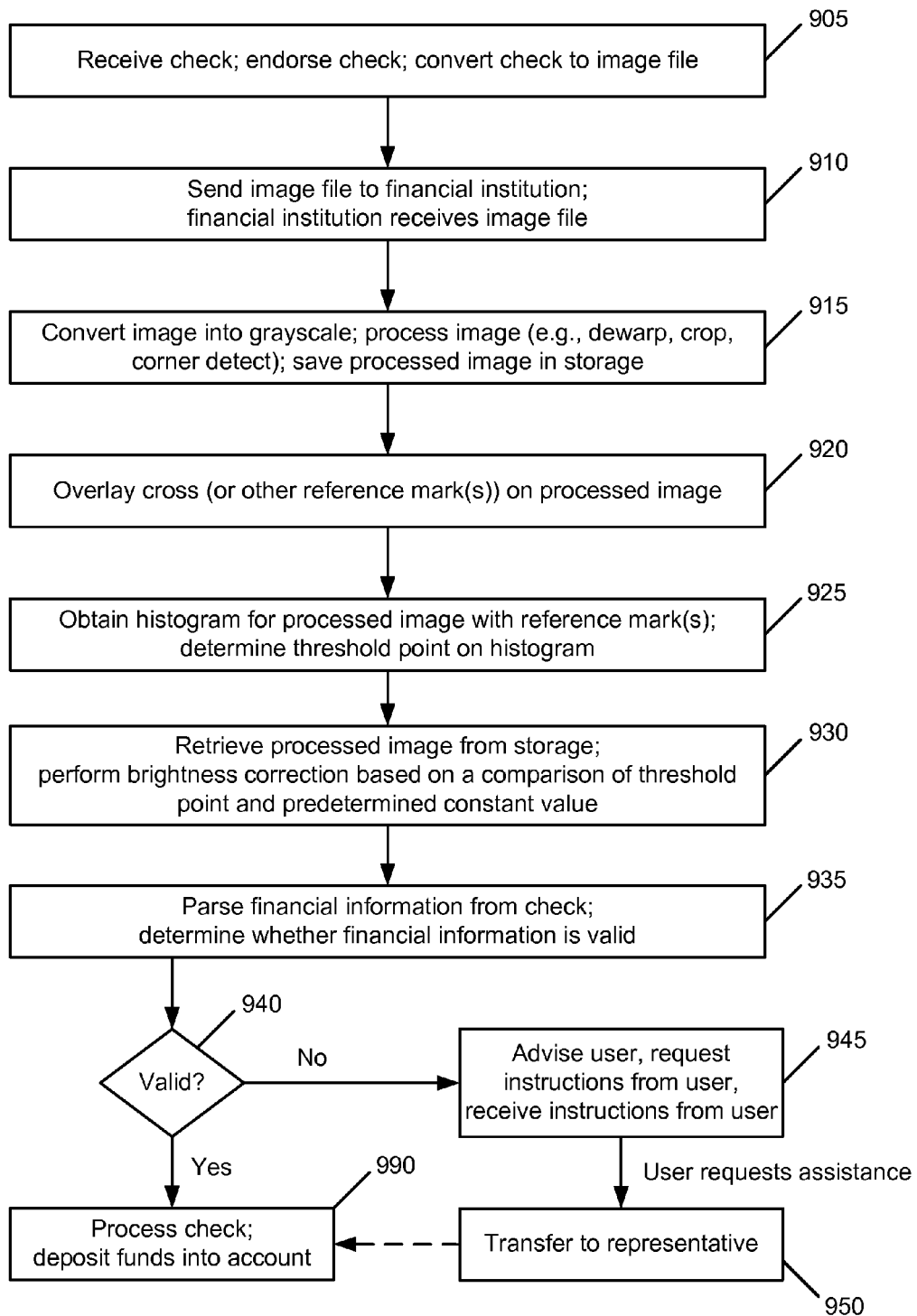
FIG. 9 is an operational flow of an implementation of a method that may be used for deposit of a negotiable instrument.

FIG. 9 is an operational flow of an implementation of a method 900 that may be used for deposit of a negotiable instrument. At 905, a user (e.g., an account owner, payee, etc.) may receive a check from a third party (i.e., a payor). The user may endorse the check by signing the back of the check in the designated field. If the user wishes to deposit the check into an account, such as a savings and/or checking account, they also may write an account number below the signature. The user may convert the check into an image file that comprises electronic data representing an image of the check. For example, the user may create an image file comprising an image of the first side of the check, the second side of the check, or both. In an implementation, the image file may be created using a digital camera or a scanner. The digital camera or scanner may be comprised within a mobile device or other user computing device or may be separate and detachably connectable therefrom.

At 910, the user may transmit the image file to a financial institution, such as a bank, that may be associated with an account for depositing funds. For example, the user may send the image file of the check to the financial institution by attaching the image file to an email. Alternatively, the image file may be sent using various means, including, but not limited to, an Internet connection via a website of the financial institution or a wireless cellular transmission. In an implementation, the image file may be sent to the financial institution via streaming.

Additionally, the image file may be augmented by secondary data, which may be information relating to the check, such as an account number, a deposit amount, or a routing number associated with the check, and/or relating to the account for depositing funds, such as the account number and/or the name on the account. The account number may appear on the check itself, below the signature endorsing the check. The account number and/or name on the account also may appear in an email, either with or without the image file, for example. The user may send the image file and the secondary data to the financial institution, using any technique, along with a request to deposit the check into a particular user account. The financial institution may receive the image file pertaining to the check along with financial information pertaining to the account for depositing funds and any secondary data.

At 915, the financial institution may convert the image into grayscale, process the image with operations such as dewarping, deskewing, edge detection, and cropping, for example, and save a copy of the processed image in storage. The processed image may be further processed for brightness correction. At 920, a reference mark, such as a cross described with respect to FIG. 3, may be overlaid on the processed image, e.g., using an image processor or computing device of the institution system. A histogram from the processed image with the reference mark may be obtained at 925. A threshold point, described above with respect to FIG. 3, may be determined for the histogram.

At 930, the copy of the processed image may be retrieved from storage and brightness correction may be performed on it. The threshold point determined at 925 may be compared with a predetermined constant value. If the threshold point is greater than the predetermined constant value, then the intensity of the image (the copy of the processed image) may remain unchanged in an implementation (e.g., no intensity or brightness is added to each pixel in the image). If the threshold point is less than or equal to the predetermined constant value, then the brightness of the image may be corrected by adding a constant amount of brightness (or intensity) to each pixel in the image (the copy of the processed image without the overlaid reference mark). Brightness correction may be used for an image of a dark check on a dark background. In an implementation, a first amount of intensity or brightness may be added to each pixel if the threshold point is greater than the predetermined constant value, and a second amount (greater than the first amount) of intensity or brightness may be added to each pixel if the threshold point is less than or equal to the predetermined constant value. The amount(s) of intensity or brightness to be added may be based on the threshold point, in an implementation.

At 935, the financial institution may parse financial information from the processed and brightness corrected (if any brightness correction has been applied) image of the check. Any known technology may be used to retrieve financial information from the image. Example technologies that may be used by the financial institution may include image editing, filtering to remove imagery except the check in the received image, image sharpening, and technologies to distinguish between the front and the back sides of the check.

After retrieving the financial information from the check in an electronic data representation form, the financial institution may determine whether the financial information such as the amount payable to the user, the account associated with the user to deposit funds, an account associated with a payor to debit funds, and a financial institution associated with the payor and/or the user may be valid at 940.

At 990, if the financial information is determined to be valid, the electronic data representation may be processed by the financial institution, thereby depositing the check in the user's account. If the financial information is determined to be invalid, then the user may be advised at 945. For example, the financial institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the image deposit again (e.g., make another image file using the camera and send it to the financial institution) or whether the user would like assistance from a representative, for example. The user may indicate how they would like to proceed.

If the user would like assistance, the financial information may be transferred to a representative for further review at 950. The representative, such as a customer service representative, a bank teller who may be located at a branch, a virtual bank teller who may be located remotely via an electronic device, or the like, may review the financial information associated with the electronic data representation to determine whether to allow the electronic data representation to be processed by the financial institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the financial institution at 990, thereby depositing the check in the user's account.

The user may receive a notice via email, facsimile, instant message, or mail, for example, that the check has been deposited into the selected account. In an implementation, if the check is not successfully deposited by image deposit, the financial institution may provide additional options to the user on how to redeem the check, such as mailing the check to the financial institution or the like.

To credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN). The ACH service provider may process the debit entry by identifying the account and bank from which the check may be drawn. If the payor's bank verifies the transaction, the ACH service provider may settle the transaction by debiting the payor's bank and crediting the user's bank. The payor's bank may then debit the payor's account.

Figure 10:
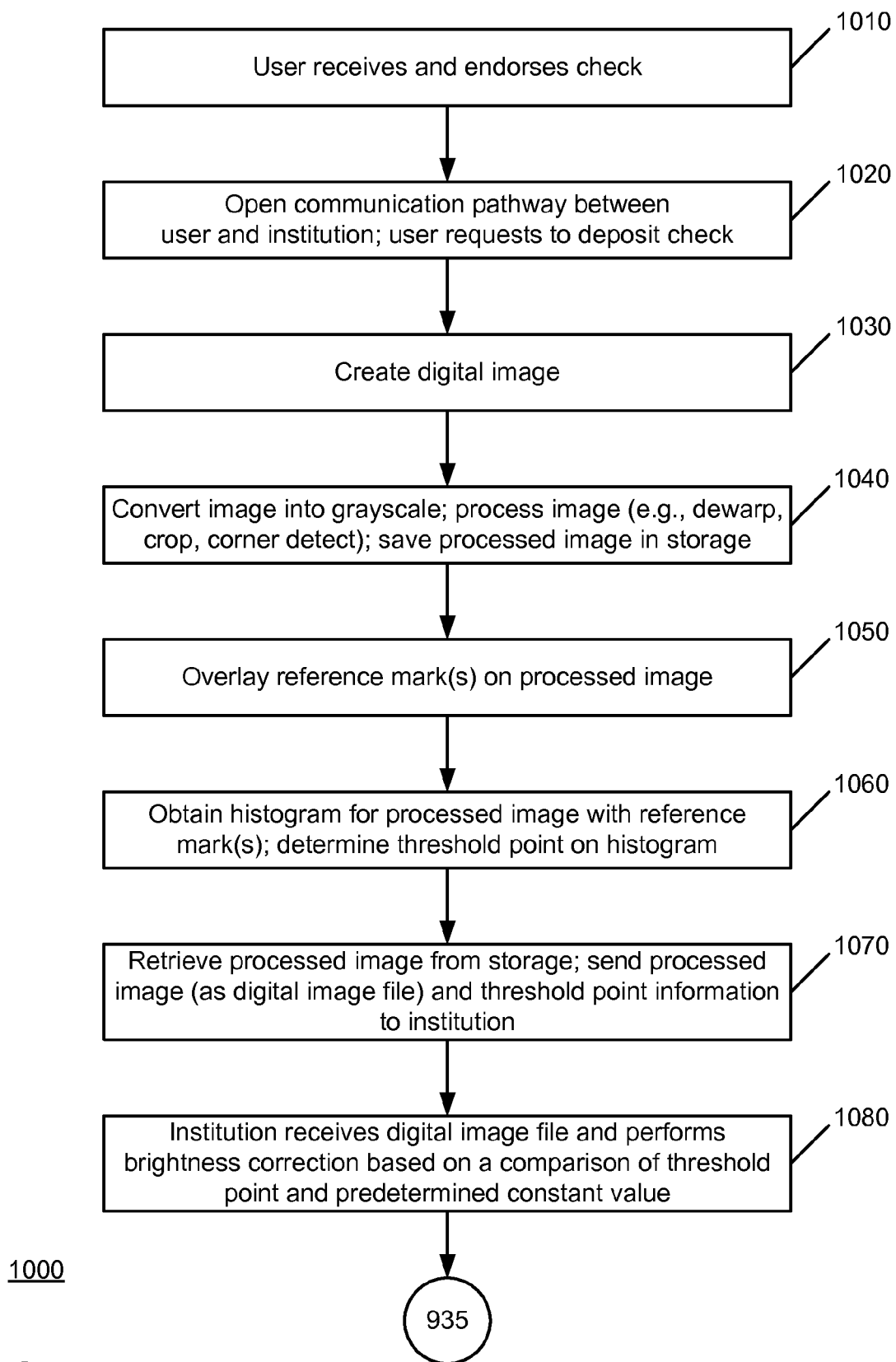
FIG. 10 is an operational flow of another implementation of a method that may be used for deposit of a negotiable instrument.

FIG. 10 is an operational flow of another implementation of a method 1000 that may be used for deposit of a negotiable instrument. At 1010, a user may receive a check from a payor and may endorse the check.

At 1020, the user may open a communication pathway with an institution that may be associated with an account for depositing funds by logging into a website of the institution, for example. There may be several ways in which a communication pathway may be established, including, but not limited to, an Internet connection via a website of the institution. The user may access the website and log into the website using credentials, such as, but not limited to, a username and a password. The user may send a request to deposit the check and may select an account in which to deposit the check. In an implementation, the user may select a "deposit check" option provided on the website, and may enter details such as check amount, date, the account the check funds should be deposited in, comments, etc.

At 1030, a digital image of the check may be created using any of the techniques described herein. In an implementation, the user may use a template (e.g., provided by the institution) to arrange the check for scanning. In this manner, the image may comprise the check image in a predetermined position or arrangement that may be easier for the user computing device and/or the institution to identify and/or process. Alternatively, the user may insert the check into a holder (e.g., provided by the institution). The check may be inserted in the holder in a predetermined position or manner. For example, the check or features of the check such as one or more corners of the check, the signature line, the MICR line, etc., may be aligned with respect to one or more marks or indicators on the holder. It is contemplated that different holders may be used for the front side of the check and for the back side of the check. The positioning or alignment may allow for more efficient processing of the check by the user computing device and/or the institution.

At 1040, using the user computing device, the image may be converted into grayscale using any known technique and the grayscale image may be processed with operations such as dewarping, deskewing, edge detection, and cropping, for example. A copy of the processed image may be saved in storage associated with the user computing device.

At 1050, the user computing device may overlay a reference mark, such as a cross, on the processed image, and a histogram may be obtained of the processed image with the reference mark at 1060. The user computing device may have a histogram generator module and/or application that may overlay the reference mark and generate a histogram. A threshold point may be determined for the histogram. In an implementation, the user computing device may determine whether the histogram is invalid or cannot be used to determine a threshold point, and if so, the user may be advised and instructed to capture another image (e.g., take another picture) of the check with processing continuing at 1030.

At 1070, the copy of the processed image may be retrieved from storage and transmitted to the financial institution (e.g., sent as a digital image file to an institution system). Information pertaining to the threshold point from the histogram may also be sent from the user computing device to the financial institution. At 1080, the financial institution may receive the copy of the processed image and perform brightness correction on the processed image. Brightness correction (e.g., an amount of intensity, if any, to add to each of the pixels of the image) may be determined based on a comparison of the threshold point and a predetermined constant value, as described with respect to 930, for example. Processing of the image for deposit of the check may continue at 935, in an implementation.

Figure 11:
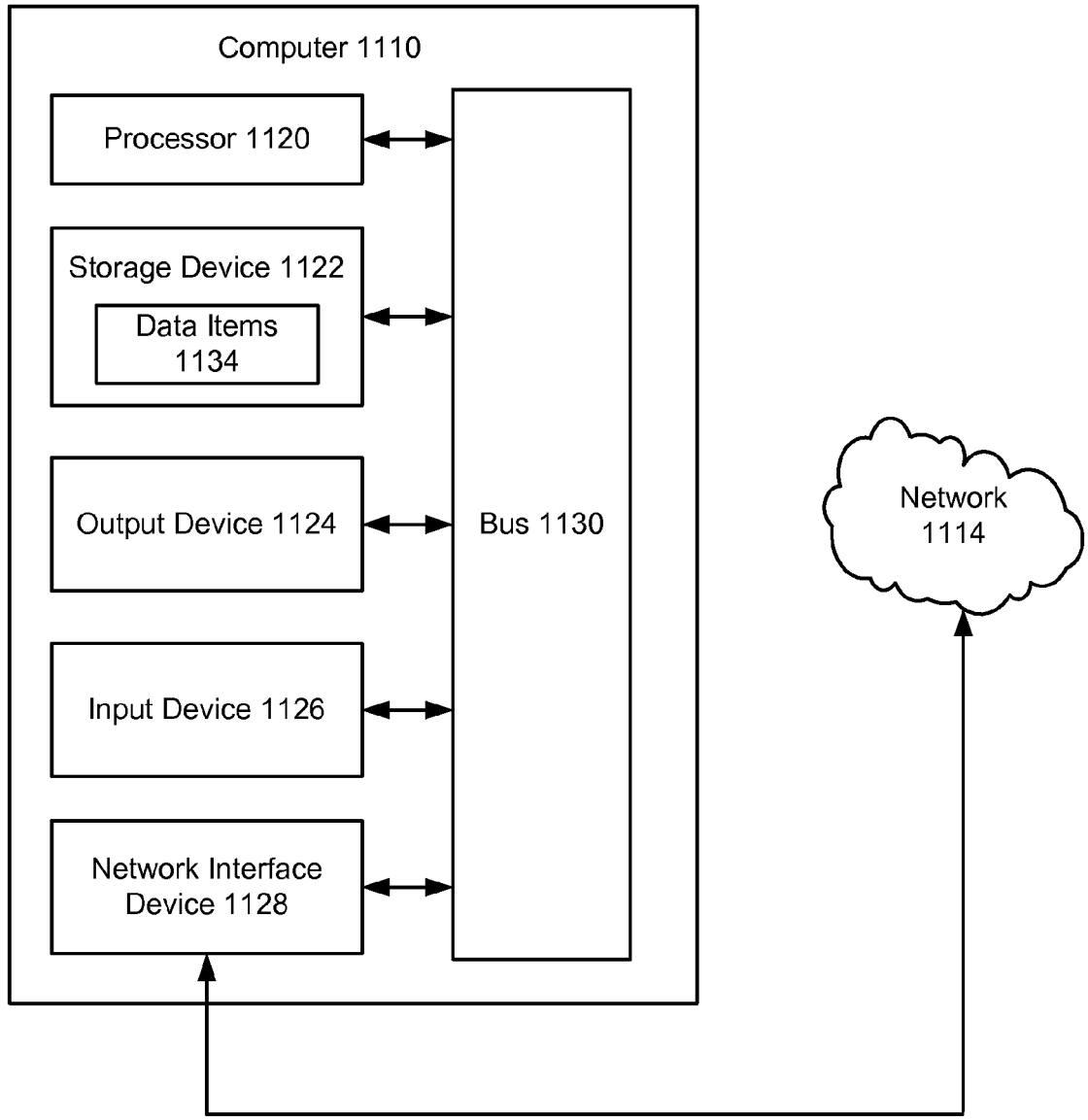
FIG. 11 is a block diagram of an example computing environment in which example embodiments and aspects may be implemented.

FIG. 11 is a block diagram of an example computing environment in which example embodiments and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, a system 1100 includes a computer 1110 connected to a network 1114. The computer 1110 includes a processor 1120, a storage device 1122, an output device 1124, an input device 1126, and a network interface device 1128, all connected via a bus 1130. The processor 1120 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1120 executes instructions and includes that portion of the computer 1110 that controls the operation of the entire computer. Although not depicted in FIG. 11, the processor 1120 typically includes a control unit that organizes data and program storage in memory and transfers data and other information between the various parts of the computer 1110. The processor 1120 receives input data from the input device 1126 and the network 1114 reads and stores code and data in the storage device 1122 and presents data to the output device 1124. Although the computer 1110 is shown to contain only a single processor 1120 and a single bus 1130, the disclosed embodiment applies equally to computers that may have multiple processors and to computers that may have multiple busses with some or all performing different functions in different ways.

The storage device 1122 represents one or more mechanisms for storing data. For example, the storage device 1122 may include read-only memory (ROM), RAM, magnetic disk storage media, optical storage media, flash memory devices, and/or other machine-readable media. In other embodiments, any appropriate type of storage device may be used. Although only one storage device 1122 is shown, multiple storage devices and multiple types of storage devices may be present. Further, although the computer 1110 is drawn to contain the storage device 1122, it may be distributed across other computers, for example on a server.

The storage device 1122 includes a controller (not shown in FIG. 11) and data items 1134. The controller includes instructions capable of being executed on the processor 1120 to carry out the functions as previously described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 1122 may also contain additional software and data (not shown), which is not necessary to understand the invention. Although the controller and the data items 1134 are shown to be within the storage device 1122 in the computer 1110, some or all of them may be distributed across other systems, for example on a server and accessed via the network 1114.

The output device 1124 is that part of the computer 1110 that displays output to the user. The output device 1124 may be a liquid crystal display (LCD) well-known in the art of computer hardware. In other embodiments, the output device 1124 may be replaced with a gas or plasma-based flat-panel display or a traditional cathode-ray tube (CRT) display. In still other embodiments, any appropriate display device may be used. Although only one output device 1124 is shown, in other embodiments any number of output devices of different types, or of the same type, may be present. In an embodiment, the output device 1124 displays a user interface. The input device 1126 may be a keyboard, mouse or other pointing device, trackball, touchpad, touch screen, keypad, microphone, voice recognition device, or any other appropriate mechanism for the user to input data to the computer 1110 and manipulate the user interface previously discussed. Although only one input device 1126 is shown, in another embodiment any number and type of input devices may be present.

The network interface device 1128 provides connectivity from the computer 1110 to the network 1114 through any suitable communications protocol. The network interface device 1128 sends and receives data items from the network 1114. The bus 1130 may represent one or more busses, e.g., USB, PCI, ISA (Industry Standard Architecture), X-Bus, EISA (Extended Industry Standard Architecture), or any other appropriate bus and/or bridge (also called a bus controller).

The computer 1110 may be implemented using any suitable hardware and/or software, such as a personal computer or other electronic computing device. Portable computers, laptop or notebook computers, PDAs, pocket computers, appliances, telephones, and mainframe computers are examples of other possible configurations of the computer 1110. For example, other peripheral devices such as audio adapters or chip programming devices, such as EPROM (Erasable Programmable Read-Only Memory) programming devices may be used in addition to, or in place of, the hardware already depicted.

The network 1114 may be any suitable network and may support any appropriate protocol suitable for communication to the computer 1110. In an embodiment, the network 1114 may support wireless communications. In another embodiment, the network 1114 may support hard-wired communications, such as a telephone line or cable. In another embodiment, the network 1114 may support the Ethernet IEEE (Institute of Electrical and Electronics Engineers) 802.3x specification. In another embodiment, the network 1114 may be the Internet and may support IP (Internet Protocol). In another embodiment, the network 1114 may be a LAN or a WAN. In another embodiment, the network 1114 may be a hotspot service provider network. In another embodiment, the network 1114 may be an intranet. In another embodiment, the network 1114 may be a GPRS (General Packet Radio Service) network. In another embodiment, the network 1114 may be any appropriate cellular data network or cell-based radio network technology. In another embodiment, the network 1114 may be an IEEE 802.11 wireless network. In still another embodiment, the network 1114 may be any suitable network or combination of networks. Although one network 1114 is shown, in other embodiments any number of networks (of the same or different types) may be present.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for processing a financial document, comprising:
    an interface configured to receive an image of the financial document from a computing device of a user having an account at a financial institution;
    an image processor configured to receive the image and overlay a reference mark on a copy of the image;
    a histogram generator configured to generate a histogram of the copy of the image having the reference mark;
    a brightness corrector configured to determine an amount of brightness to add to each pixel of the image based on the histogram of the copy of the image, and add the amount of brightness to each pixel of the image in order to generate a brightness corrected image; and
    wherein the image processor is further configured to obtain financial information pertaining to the financial document from the brightness corrected image.

2. The system of claim 1, wherein the image processor is further configured to dewarp and deskew the image prior to overlaying the reference mark on the copy of the image, wherein the copy of the image is a copy of the dewarped and deskewed image.

3. The system of claim 1, wherein the histogram generator is further configured to determine a threshold point on the histogram and use the threshold point in determining the amount of brightness to add to each pixel of the image.

4. The system of claim 1, further comprising a processor configured to deposit funds identified in the financial document into the account at the financial institution based on the financial information pertaining to the financial document.

5. The system of claim 1, wherein the reference mark comprises a black cross that covers a portion of the financial document and a portion of a background in the copy of the image.

6. The system of claim 1, wherein the financial document comprises a negotiable instrument.

7. The system of claim 1, wherein the computing device of the user comprises a mobile device.

8. A computer-readable medium comprising computer-readable instructions for processing a financial document, said computer-readable instructions comprising instructions for causing a processor to:
    receive an image of the financial document at an image processor of a financial institution from a computing device of a user;
    receive brightness correction information for the image at the image processor of the financial institution from the computing device of the user;
    generate a brightness corrected image by adding an amount of brightness to each pixel of the image of the financial document based on the brightness correction information at the image processor of the financial institution; and
    store the brightness corrected image in a storage of a computer of the financial institution.

9. The computer-readable medium of claim 8, wherein the brightness correction information comprises a threshold point of a histogram, generated at the computing device of the user, of a copy of the image.

10. The computer-readable medium of claim 9, wherein the copy of the image comprises a reference mark that divides the image into quadrants.

11. The computer-readable medium of claim 9, further comprising instructions to cause the processor to determine the amount of brightness to add to each pixel of the image using the threshold point.

12. The computer-readable medium of claim 8, further comprising instructions to cause the processor to obtain financial information pertaining to the financial document from the brightness corrected image.

13. The computer-readable medium of claim 8, further comprising instructions to cause the processor to clear the financial document by using the brightness corrected image.

14. The computer-readable medium of claim 8, wherein the image of the financial document received at the image processor of a financial institution from the computing device of the user is dewarped and deskewed by the computing device of the user.

15. A system for processing a financial document, comprising:
    an interface configured to receive a request from a mobile device for access to a deposit system of a financial institution system, and recieve an image of a financial document related to the deposit system;
    an image processor configured to correct a brightness of the image of the financial document by using a histogram of the image;
    obtaining information from the image of the financial document, and
    a processor configured to generate command signals for controlling an acceptance of the financial document by the related deposit system based on information obtained from the image of the financial document.

16. The system of claim 15, wherein the image processor is configured to generate the histogram on a copy of the image comprising an overlaid reference mark.

17. The system of claim 15, wherein the histogram is generated at the mobile device on a copy of the image comprising an overlaid reference mark.

18. The system of claim 15, wherein the image processor is further configured to deskew or dewarp the image prior to generating the histogram used in the brightness correcting.

19. The system of claim 15, wherein the mobile device deskews or dewarps the image prior to the image being received at the interface.

20. The system of claim 18, wherein the image processor is configured to deskew or dewarp the image after the image is received at the interface.

21. The system of claim 15, wherein the image processor is further configured to determine a threshold point of the histogram and use the threshold point in determining an amount of brightness to add to each pixel of the image.

* * * * *